United States Patent
Marvin et al.

(10) Patent No.: US 12,042,011 B2
(45) Date of Patent: Jul. 23, 2024

(54) MOLDED FOOTWEAR UPPER AND METHOD OF MAKING SAME

(71) Applicant: Reebok International Limited, Altrincham (GB)

(72) Inventors: William Marvin, Canton, MA (US); Kevin Leary, Dedham, MA (US); Paul E. Litchfield, Westboro, MA (US); Thomas Piacentini, Franklin, MA (US)

(73) Assignee: Reebok International Limited, Altrincham (GB)

( * ) Notice: Subject to any disclaimer, the term of this patent is extended or adjusted under 35 U.S.C. 154(b) by 940 days.

(21) Appl. No.: 16/678,569

(22) Filed: Nov. 8, 2019

(65) Prior Publication Data
US 2020/0068994 A1 Mar. 5, 2020

Related U.S. Application Data

(62) Division of application No. 13/849,386, filed on Mar. 22, 2013, now Pat. No. 10,499,706.

(51) Int. Cl.
B29D 35/14 (2010.01)
A43B 1/00 (2006.01)
A43B 23/02 (2006.01)

(52) U.S. Cl.
CPC ............ *A43B 23/0235* (2013.01); *A43B 1/00* (2013.01); *A43B 23/0255* (2013.01); *A43B 23/026* (2013.01); *A43B 23/028* (2013.01); *B29D 35/146* (2013.01); *B29D 35/148* (2013.01)

(58) Field of Classification Search
None
See application file for complete search history.

(56) References Cited

U.S. PATENT DOCUMENTS

| | | |
|---|---|---|
| 643,659 A | 2/1900 | Kohn |
| 1,028,586 A | 6/1912 | McMullan |
| 2,253,860 A | 8/1941 | Martin |
| 2,275,191 A | 3/1942 | Schwartz et al. |
| 2,700,229 A | 1/1955 | Dubin |
| 2,942,359 A | 6/1960 | Bushway et al. |
| 3,239,952 A | 3/1966 | Lange et al. |
| 3,581,412 A | 6/1971 | Dalebout |
| 3,583,081 A | 6/1971 | Hayashi |
| 3,642,563 A | 2/1972 | Davis et al. |
| 3,694,940 A | 10/1972 | Stohr |
| 3,793,750 A | 2/1974 | Bowerman |
| 3,977,098 A | 8/1976 | Chalmers |
| 4,255,202 A | 3/1981 | Swan, Jr. |
| 4,255,876 A | 3/1981 | Johnson |
| 4,342,159 A | 8/1982 | Edwards |
| 4,559,722 A | 12/1985 | Norton |
| 4,594,798 A | 6/1986 | Autry et al. |
| 4,642,916 A | 2/1987 | Collins |

(Continued)

*Primary Examiner* — Christopher T Schatz
(74) *Attorney, Agent, or Firm* — Sterne, Kessler, Goldstein & Fox P.L.L.C.

(57) ABSTRACT

A method for manufacturing an upper for an article of footwear includes: forming a foam layer; forming a preliminary upper by laminating an outer layer, an inner layer, and the foam layer intermediate to the outer layer and the inner layer; and molding the preliminary upper to a shape having a contour to substantially fit at least a portion of a foot to provide at least a portion of an upper for an article of footwear.

15 Claims, 17 Drawing Sheets

(56) References Cited

U.S. PATENT DOCUMENTS

| | | |
|---|---|---|
| 4,662,088 A | 5/1987 | Autry et al. |
| 4,706,316 A | 11/1987 | Tanzi |
| 4,726,126 A | 2/1988 | Bernhard |
| 4,858,339 A | 8/1989 | Hayafuchi et al. |
| RE33,090 E | 10/1989 | Berguer |
| 5,014,449 A * | 5/1991 | Richard ............... A43B 13/187 36/114 |
| 5,067,257 A | 11/1991 | Coomer |
| 5,090,140 A | 2/1992 | Sessa |
| 5,351,352 A | 10/1994 | Chillemi |
| RE34,890 E | 4/1995 | Sacre |
| 5,604,997 A | 2/1997 | Dieter |
| 5,746,015 A | 5/1998 | Clement et al. |
| 5,765,296 A | 6/1998 | Ludemann et al. |
| 5,842,292 A | 12/1998 | Siesel |
| 5,885,500 A | 3/1999 | Tawney et al. |
| 5,924,218 A | 7/1999 | Dalvy et al. |
| 5,964,047 A | 10/1999 | Covatch |
| 6,079,128 A | 6/2000 | Hoshizaki et al. |
| 6,230,423 B1 | 5/2001 | Donnelly |
| 6,260,288 B1 | 7/2001 | Barthelemy et al. |
| 6,279,251 B1 | 8/2001 | Davis |
| 6,299,962 B1 | 10/2001 | Davis et al. |
| 6,438,868 B1 | 8/2002 | Fini |
| 6,455,128 B1 | 9/2002 | Moon |
| 6,533,885 B2 | 3/2003 | Davis et al. |
| 6,558,784 B1 | 5/2003 | Norton et al. |
| 6,671,981 B2 | 1/2004 | Brooks |
| 6,701,643 B2 | 3/2004 | Geer et al. |
| 6,769,203 B1 | 8/2004 | Wright et al. |
| 6,796,876 B2 | 9/2004 | Luk |
| 6,805,610 B2 | 10/2004 | Luk |
| 6,805,611 B2 | 10/2004 | Luk |
| 6,805,612 B1 | 10/2004 | Luk |
| 6,837,772 B1 | 1/2005 | Luk |
| 6,871,424 B2 | 3/2005 | Labontéet al. |
| 6,878,033 B2 | 4/2005 | Luk |
| 6,899,590 B2 | 5/2005 | Luk |
| 6,931,762 B1 | 8/2005 | Dua |
| 6,986,697 B2 | 1/2006 | Luk |
| 7,028,419 B2 | 4/2006 | Brooks |
| 7,043,788 B2 | 5/2006 | Sheets et al. |
| 7,059,067 B2 | 6/2006 | Geer et al. |
| 7,128,635 B1 | 10/2006 | Liu |
| 7,166,012 B1 | 1/2007 | Lau |
| 7,179,150 B2 | 2/2007 | Luk et al. |
| 7,192,332 B2 | 3/2007 | Liu |
| 7,198,540 B2 | 4/2007 | Liu |
| 7,219,900 B2 | 5/2007 | Meibock |
| 7,316,083 B2 | 1/2008 | Labonté |
| 7,350,321 B2 | 4/2008 | Soon et al. |
| 7,407,427 B1 | 8/2008 | Liu |
| 7,410,684 B2 | 8/2008 | McCormick |
| 7,422,110 B2 | 10/2008 | Gaudet et al. |
| 7,435,156 B1 | 10/2008 | Liu |
| 7,464,489 B2 | 12/2008 | Ho |
| 7,563,152 B2 | 7/2009 | Liu |
| 7,591,083 B2 | 9/2009 | Geer et al. |
| 7,604,526 B2 | 10/2009 | Liu |
| 7,631,440 B2 | 12/2009 | Keen et al. |
| 7,793,434 B2 | 9/2010 | Sokolowski et al. |
| 7,827,703 B2 | 11/2010 | Geer et al. |
| 7,997,009 B2 | 8/2011 | Fuerst |
| 8,128,456 B2 | 3/2012 | Liu |
| 8,133,091 B2 | 3/2012 | Liu |
| 8,215,032 B2 | 7/2012 | Sokolowski et al. |
| 8,347,438 B2 | 1/2013 | Bell |
| 8,387,286 B2 | 3/2013 | Koyess et al. |
| 8,429,835 B2 | 4/2013 | Dojan et al. |
| 8,544,191 B2 | 10/2013 | Marvin et al. |
| 8,689,382 B2 | 4/2014 | Hooper et al. |
| 2001/0007180 A1 | 7/2001 | Bordin et al. |
| 2001/0055684 A1 | 12/2001 | Davis et al. |
| 2002/0002780 A1 | 1/2002 | Barthelemy et al. |
| 2002/0007568 A1 | 1/2002 | Kellerman et al. |
| 2002/0012784 A1 | 1/2002 | Norton et al. |
| 2002/0066212 A1 | 6/2002 | Pavelescu et al. |
| 2002/0071946 A1 | 6/2002 | Norton et al. |
| 2003/0000111 A1 | 1/2003 | Basso |
| 2003/0131498 A1 | 7/2003 | Liang |
| 2003/0192107 A1 | 10/2003 | Williams |
| 2003/0233771 A1 | 12/2003 | Soon et al. |
| 2004/0083623 A1 | 5/2004 | Lu |
| 2004/0103562 A1 | 6/2004 | Chaigne |
| 2004/0118018 A1 | 6/2004 | Dua |
| 2004/0139628 A1 | 7/2004 | Wiener |
| 2004/0143996 A1 | 7/2004 | Chen et al. |
| 2004/0168357 A1 | 9/2004 | Meibock |
| 2005/0028405 A1 | 2/2005 | Wilson et al. |
| 2005/0034330 A1 | 2/2005 | Baychar |
| 2005/0081402 A1 | 4/2005 | Orei et al. |
| 2006/0010718 A1 | 1/2006 | Auger et al. |
| 2006/0048413 A1 | 3/2006 | Sokolowski et al. |
| 2006/0064903 A1 * | 3/2006 | Tucker ................... A43B 23/07 36/88 |
| 2006/0112594 A1 | 6/2006 | Kilgore |
| 2006/0112595 A1 | 6/2006 | Vattes et al. |
| 2006/0130367 A1 | 6/2006 | Liu |
| 2006/0137223 A1 | 6/2006 | Ziccarelli |
| 2007/0062067 A1 | 3/2007 | Covatch |
| 2007/0137069 A1 | 6/2007 | Patakos |
| 2007/0186448 A1 | 8/2007 | Meibock |
| 2007/0199210 A1 | 8/2007 | Vattes et al. |
| 2008/0028635 A1 | 2/2008 | Park |
| 2008/0120871 A1 | 5/2008 | Sato et al. |
| 2008/0201987 A1 | 8/2008 | Bell |
| 2008/0250668 A1 | 10/2008 | Marvin et al. |
| 2008/0289222 A1 | 11/2008 | Candrian et al. |
| 2009/0071036 A1 | 3/2009 | Hooper et al. |
| 2009/0241374 A1 | 10/2009 | Sato et al. |
| 2010/0011620 A1 | 1/2010 | Nakano |
| 2010/0077634 A1 | 4/2010 | Bell |
| 2010/0107452 A1 | 5/2010 | Baychar |
| 2010/0287790 A1 | 11/2010 | Sokolowski et al. |
| 2011/0016749 A1 | 1/2011 | Callahan et al. |
| 2011/0056095 A1 | 3/2011 | Torrance |
| 2011/0078921 A1 * | 4/2011 | Greene ............... A43B 23/0235 36/47 |
| 2011/0083340 A1 | 4/2011 | Leary et al. |
| 2011/0088282 A1 | 4/2011 | Dojan et al. |
| 2011/0119957 A1 | 5/2011 | Hooper et al. |
| 2011/0131842 A1 | 6/2011 | Sek |
| 2011/0192060 A1 | 8/2011 | Crain |
| 2011/0225845 A1 | 9/2011 | Dean et al. |
| 2011/0225848 A1 | 9/2011 | Baychar |
| 2012/0073160 A1 | 3/2012 | Marvin et al. |
| 2012/0144698 A1 | 6/2012 | McDowell |
| 2012/0180340 A1 | 7/2012 | Crowley, II et al. |
| 2012/0180341 A1 | 7/2012 | Crowley, II et al. |
| 2013/0047471 A1 | 2/2013 | Liang |
| 2015/0189945 A1 | 7/2015 | Liang |
| 2015/0189952 A1 | 7/2015 | Liang |
| 2015/0289589 A1 | 10/2015 | Nishiwaki et al. |

* cited by examiner

MOLDED FOOTWEAR UPPER AND METHOD OF MAKING SAME

CROSS-REFERENCE TO RELATED APPLICATION

This application is a divisional of U.S. application Ser. No. 13/849,386, filed Mar. 22, 2013, which is hereby incorporated herein in its entirety by reference.

BACKGROUND OF THE INVENTION

Field of the Invention

Embodiments of the present invention generally relate to footwear, and more particularly relate to a molded upper for an article of footwear and related methods of making the same.

Background Art

Shoe manufacture is a labor intensive process. The typical shoe manufacturing process encompasses the steps of cutting the upper material, reducing the thickness of the joining edges ("skiving"), reducing the thickness of the upper pieces ("splitting"), cementing the interlining to the upper pieces ("interlining"), forming the eyelets, stitching the upper pieces together, shaping the upper over a last ("lasting") and cementing, molding or sewing the bottom or sole of the shoes to the upper ("bottoming"). Modern footwear designs, particularly athletic shoe designs, require numerous upper pieces and complicated manufacturing steps, leading to high labor costs. Additionally, a new pattern is required and the manufacturing process must be retooled for every new design and style and for each desired shoe size. Even manufacturing processes that include molding techniques often involve other complicated manufacturing steps.

Proper footwear should complement the natural functionality of the foot, in part, by incorporating an upper that provides necessary comfort, stability, and other desired characteristics. The desired upper characteristics are often different for each footwear design, and may often be unique to the wearer. What is needed, therefore, is an improved labor-saving and time-saving method of manufacturing footwear that may require reduced costs. Further, improved and effective manufacturing techniques may provide for improved footwear customization capability.

BRIEF SUMMARY OF THE INVENTION

In one embodiment, a method for manufacturing an upper for an article of footwear includes: forming a contoured foam layer; forming a preliminary upper by laminating an outer layer, an inner layer, and the foam layer intermediate to the outer layer and the inner layer; and molding the preliminary upper to a shape having a contour to substantially fit at least a portion of a foot to provide at least a portion of an upper for an article of footwear.

In another embodiment, a method for manufacturing an upper for an article of footwear includes: forming a foam layer; forming a laminate having an outer layer, an inner layer, and the foam layer intermediate to the outer layer and the inner layer; applying heat and pressure to the laminate to form a medial portion of an upper shaped to fit a medial portion of a foot and a lateral portion of an upper shaped to fit a lateral portion of the foot; and attaching the medial portion to the lateral portion to form a single piece upper for an article of footwear.

In yet another embodiment, a method for manufacturing an article of footwear includes: forming a single piece preliminary upper having an outer layer comprising an elastic polyurethane fiber, an inner layer, and a foam layer disposed between the outer layer and the inner layer; molding the preliminary upper to form a medial portion of an upper shaped to fit a medial portion of a foot and a lateral portion of an upper shaped to fit a lateral portion of the foot; attaching the lateral portion to the medial portion to form a single piece upper for an article of footwear; and attaching a sole to the upper.

In another embodiment, a method for manufacturing an article of footwear includes: forming a contoured foam cushioning member; forming a preliminary upper by enveloping the foam cushioning member between an outer layer and an inner layer; and molding the preliminary upper to a shape having a contour to substantially fit at least a portion of a foot.

In still another embodiment, an upper for an article of footwear includes a single piece laminate including a contoured foam cushioning member, an inner layer, and an outer layer, wherein the foam cushioning member is enveloped between the inner layer and the outer layer. A first region of the single piece laminate corresponds to a portion of a lateral side of the foot and a second region of the single piece laminate corresponds to a portion of a medial side of the foot. The outer layer comprises an elastic material.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
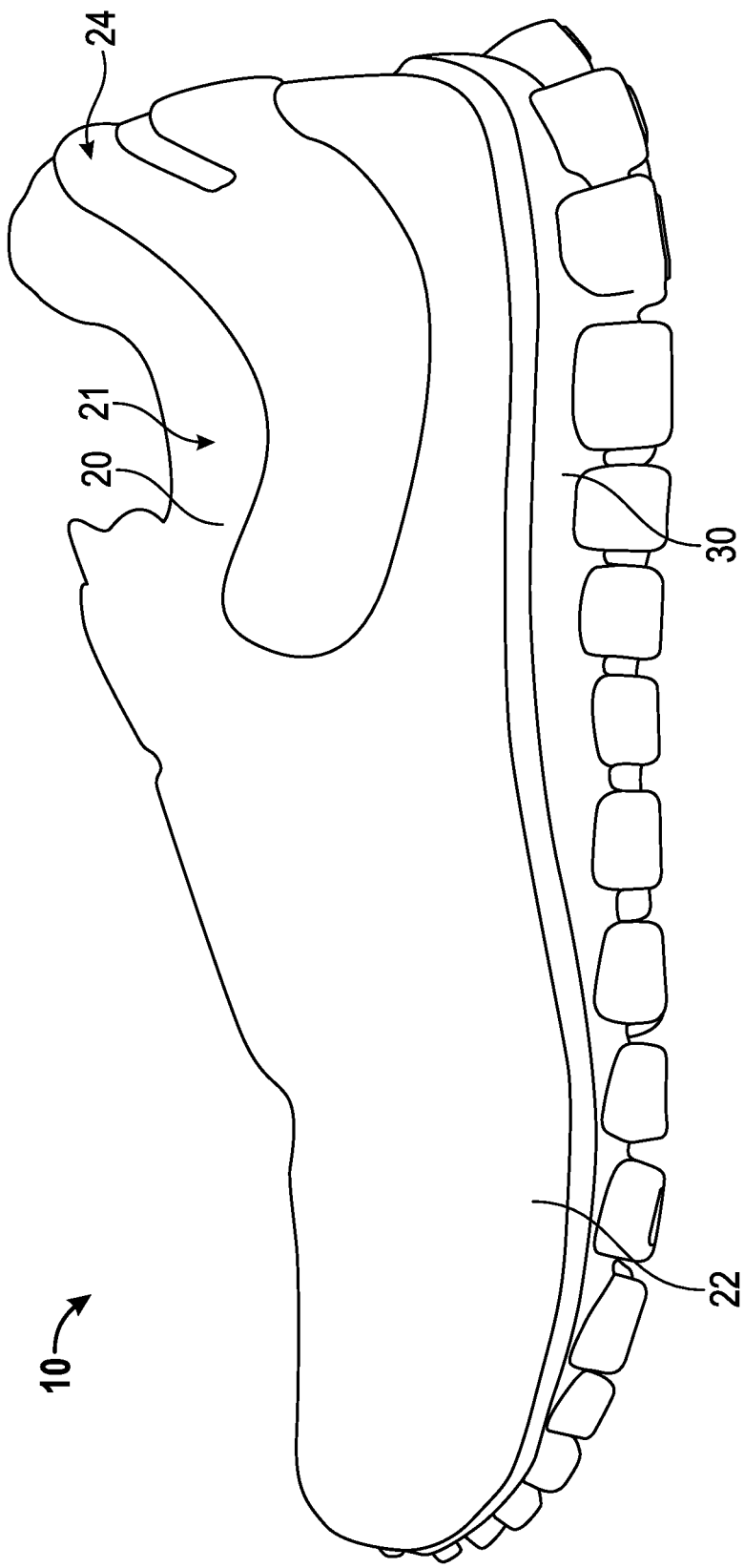
FIG. 1 is a lateral side view of an article of footwear having a molded upper according to an embodiment of the present invention.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention include an upper 20 for an article of footwear 10, and methods of making same. In some embodiments, the article of footwear 10 includes a sole 30 coupled to the upper 20. With reference to FIGS. 1-5, for example, in one embodiment, the upper 20 includes an outer layer 22 and an inner layer 23 enveloping a cushioning member 24 to form a single piece laminate 21. Before the laminate 21 undergoes molding according to embodiments of the present invention, the single piece laminate 21 may comprise a preliminary upper structure to be molded to form all or a portion of the upper 20. During manufacture, the laminate 21 may be cut and molded to a shape having a contour to substantially fit at least a portion of a foot. In this manner, the footwear 10 is provided using an improved labor-saving and customizable method of manufacturing footwear that may reduce costs.

In one embodiment, the laminate 21 may be molded by applying heat and pressure to the laminate 21 to form the upper 20 or one or more portions of the upper 20. In one embodiment, the mold may be heated in order to heat and mold the laminate 21. In one embodiment, the laminate 21 may be heated (e.g., in a suitable oven) and then put into a mold for application of pressure to mold the laminate 21. Other molding techniques, also may be used to mold the single piece laminate 21 into the upper 20 or one or more portions of the upper 20. For example, all or components of the laminate 21 may be provided as a liquid formulation that foams into shape inside of a mold. According to some embodiments of the present invention, the laminate 21 may be molded using aspects of contour shape pressing techniques used in molding brassieres, such as those described, for example in U.S. Pat. No. 6,805,610, the disclosure of which is incorporated herein by reference thereto.

In one embodiment, the outer layer 22 and/or the inner layer 23 comprise an elastic material such as, for example, Lycra®. In one embodiment, in particular, one or both of the outer layer 22 and the inner layer 23 may comprise a 4-way stretch Lycra®. In one embodiment, the outer layer 22 and/or the inner layer 23 comprise about 40% Lycra content with another material, such as, for example nylon. In this manner, the outer layer 22 and the inner layer 23 provide a single piece laminate 21 structure that is lightweight and flexible. Other suitable materials, including, but not limited to, elastic polyurethane fiber, elastane, a 2-way stretch material, a 4-way stretch material, and polyamide nylon, may be used. In one embodiment, the material used for the inner layer 23 and/or outer layer 22 may comprise material similar to that used for intimate apparel, such as, for example, brassieres, and the like. In one embodiment, the outer layer 22 and the inner layer 23 are made of the same material. In another embodiment, the outer layer 22 and the inner layer 23 are made of different materials. In one embodiment, one or more layers of the laminate 21, including one or more of the outer layer 22 and the inner layer 23, comprise materials having suitable breathability, wicking characteristics, waterproof characteristics, and/or non-abrasive characteristics. In one embodiment, one or both of the outer layer 22 and the inner layer 23 may comprise a weft knitting fabric having moisture management supplied by Best Pacific Textile Ltd. having an article no. PL-995MFX1. In one embodiment, the outer layer 22 and/or the inner layer 23 may comprise a material having high elongation characteristics (e.g., about 500%—about 700%), low elastic modulus (e.g., about 200% elongation, about 0.04 to about 0.12 g/denier), and/or high elastic recovery rate (e.g., about 200% elongation, 95%-99%).

Figure 3:
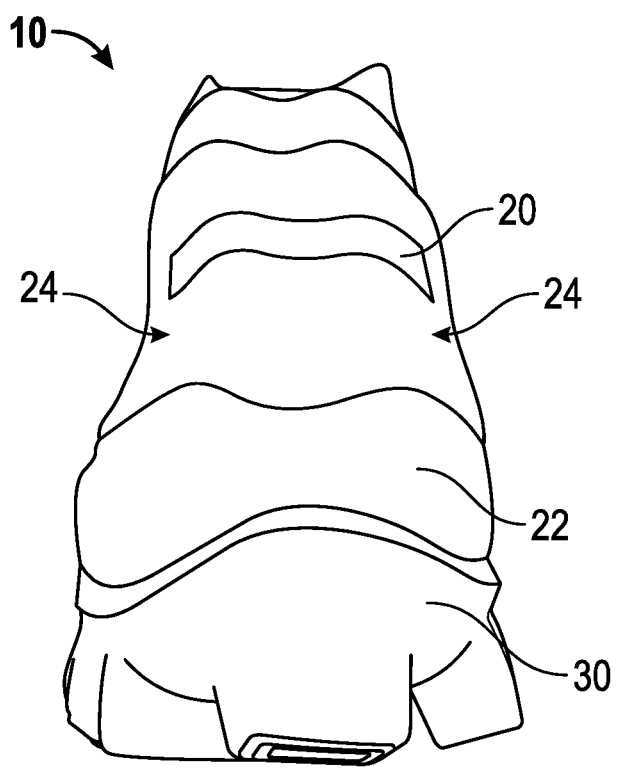
FIG. 3 is a rear view of an article of footwear having a molded upper according to an embodiment of the present invention.
Figure 4:
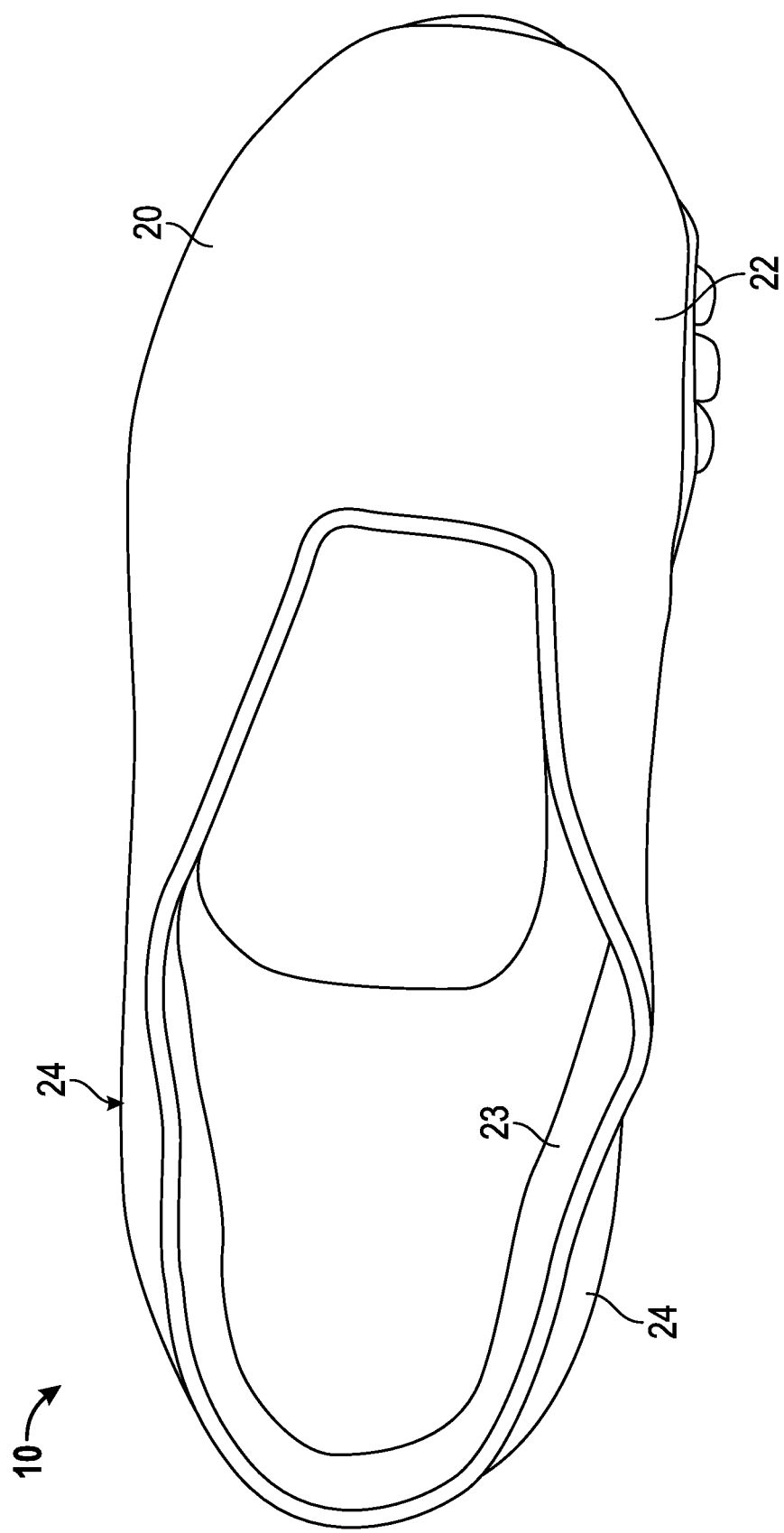
FIG. 4 is a top plan view of an article of footwear having a molded upper according to an embodiment of the present invention.
Figure 5:
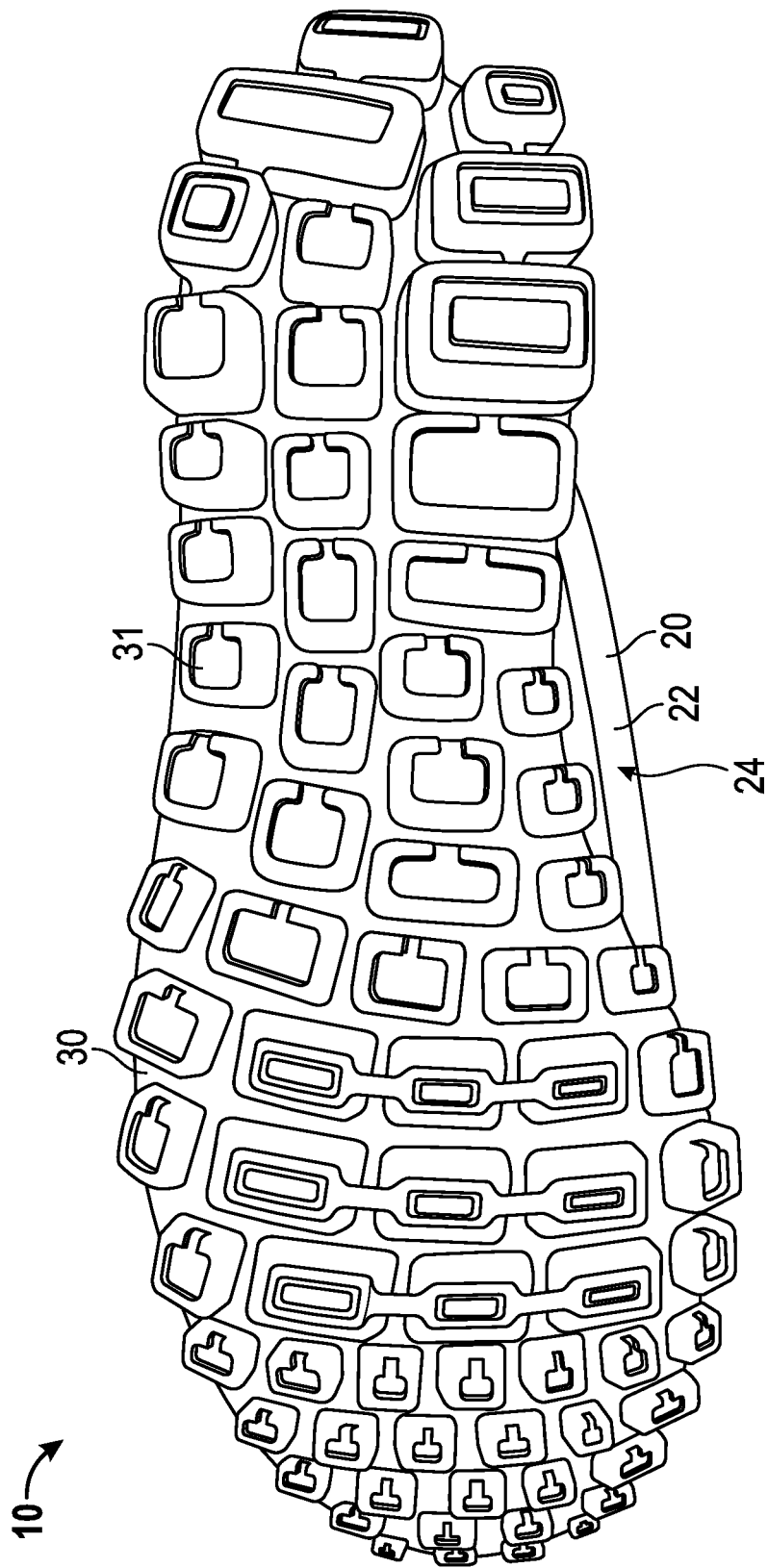
FIG. 5 is a bottom plan view of a sole for an article of footwear having a molded upper according to an embodiment of the present invention.

In one embodiment, the cushioning member 24 comprises a contoured foam. The cushioning member 24 may be contoured to provide desired cushioning characteristics. In this manner, the cushioning member 24 may be contoured to a shape that substantially fits at least a portion of the foot of the wearer. For example, as shown in FIG. 3, the cushioning member 24 may be contoured to a shape that cushions a heel portion of the foot. In other embodiments, the cushioning member 24 may be contoured to a shape that cushions an upper portion of the foot corresponding to a vamp or tongue portion of the footwear 10, a quarter panel, a collar, or any other desired portion of the upper. In some embodiments, cushioning member 24 may be contoured to a shape for aesthetic purposes.

Figure 23:
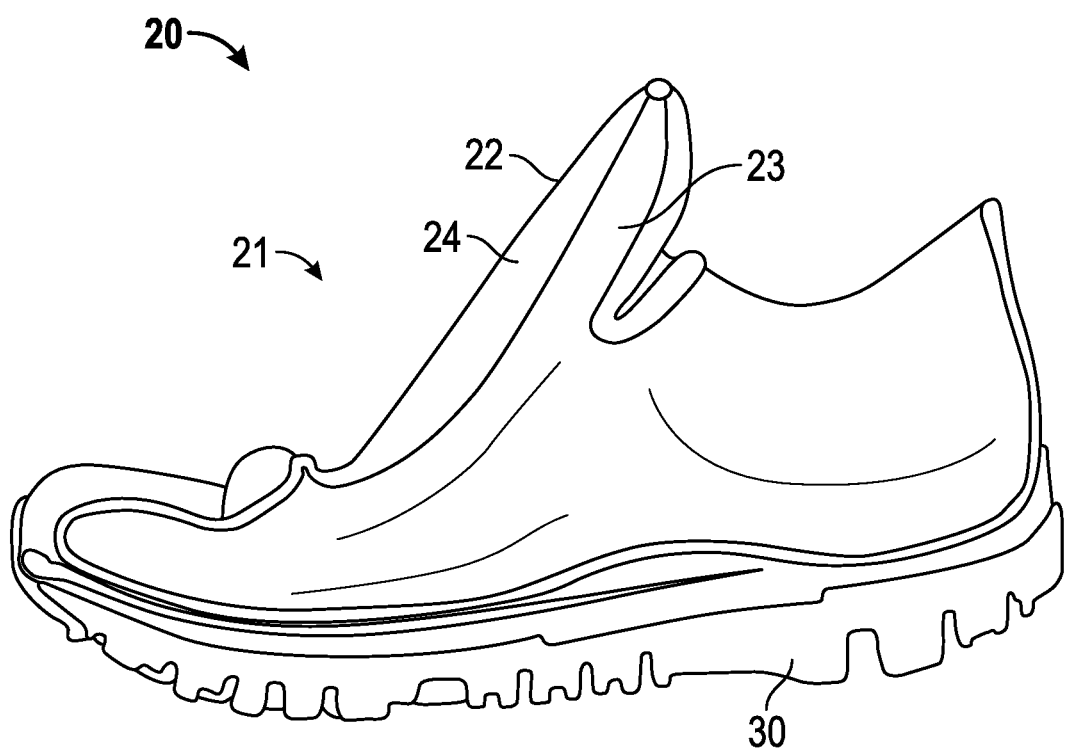
FIG. 23 is a cross sectional view of a molded upper according to an embodiment of the present invention.

With reference to FIG. 23, in one embodiment, the cushioning member 24 may be precisely contoured such that it has varying thickness to fit the desired area between outer layer 22 and inner layer 23. In some embodiments, cushioning member 24 may have asymmetrical cross-sections. The cushioning member 24 may be contoured using skiving, molding, heat molding, pressure molding, blow molding, or other suitable techniques. However, unlike conventional foam pieces used in footwear to provide cushioning or contour, including die-cut foam pieces, the cushioning member 24 is pre-shaped before inclusion in the laminate 21 for molding and is provided to have a uniform presence within the laminate 21. For example, the upper 20 having a cushioning member 24 according to embodiments of the present invention may be provided without any gaps between the cushioning member 24 and the outer layer 22 and/or inner layer 23. For example, as shown in FIG. 23, the cushioning member 24 tapers to the point of intersection between the outer layer 22 and inner layer 23 such that there are no gaps between the cushioning member and the layers. In contrast, in conventional uppers a die-cut block of foam may be placed in a similar area, causing gaps between the foam and the inner and outer layers at the point of intersection. In addition, in some embodiments, unlike conventional foam pieces which may be compressed or "wedged" to fit into an area between an inner layer and outer layer of the conventional shoe, the cushioning member 24 is not compressed to fit within an area of the upper but rather is precisely contoured to fit the area. Because the cushioning member 24 is not compressed, the laminate 21 may be provided with a cushioning member 24 having a substantially uniform density throughout. In this manner, the cushioning member 24 may more comfortably fit to a portion of the wearer's foot, and may provide the desired cushioning, feel, and aesthetic characteristics Suitable material for cushioning member 24 may include, but is not limited to, foam, thermoplastic polyurethane (TPU), and thermoplastic rubber (TPR). In one embodiment, cushioning member 24 may comprise a high grade memory foam. When cushioning member 24 is a foam, the foam may be, for example, ethyl vinyl acetate (EVA) based or polyurethane (PU) based and the foam may be an open-cell foam or a closed-cell foam. In other embodiments, cushioning member 24 may comprise elastomers, thermoplastic elastomers (TPE), polyethylene (PE), foam-like plastic (e.g., Pebax® foam or Hytrel® foam) and gel-like plastics.

Upper 20 may be used in conjunction with a variety of soles 30. In one embodiment, the sole 30 may include a plurality of projections 31 to provide the desired cushioning and ride characteristics for the footwear 10, as shown, for example, in FIG. 5, and as described, for example, in U.S. Patent Application Publication No. 2012/0073160, entitled "Sole With Projections and Article of Footwear" and published on Mar. 29, 2012, the disclosure of which is incorporated herein in its entirety by reference thereto. In one embodiment, the sole 30 may undulate to define gaps in its top and bottom surface so as to be substantially sinusoidal, as described, for example, in U.S. Patent Application Publication No. 2011/0016749, entitled "Article of Footwear and Methods of Making Same" and published on Jan. 27, 2011, the disclosure of which is incorporated herein in its entirety by reference thereto.

In one embodiment, the sole 30 may comprise a resilient material such that the sole provides a flexible ride and desired cushioning to the wearer. In one embodiment, the sole 30 comprises foam, such as, for example, ethyl vinyl acetate (EVA) foam or polyurethane (PU) foam, and the foam may be an open-cell foam or a closed-cell foam. In other embodiments, sole 30 may comprise elastomers, thermoplastic elastomers (TPE), foam-like plastic (e.g., Pebax® foam or Hytrel® foam), gel-like plastics, thermoplastic rubber (TPR), and combinations thereof. In one embodiment, the sole 30 may include a molded thermoplastic component such as, for example, an injection molded TPU component. In one embodiment of the present invention, an insole and/or sockliner may also be included within the footwear 10. In some embodiments, the sole 30 may include an insole and/or sockliner. In some embodiments, a plate may be disposed between the sole 30 and the wearer's foot. The plate may comprise, for example, compressed cellulose, plastic, TPU, and the like. Sole 30 may be attached to the upper 20 using adhesive bonding, stitching, welding, or other suitable techniques.

In one embodiment of the present invention, an outsole (not shown) may be disposed on all or a portion of the bottom surface of the sole 30. The outsole may comprise a wear-resistant material. For example, the outsole can include synthetic or natural rubber, polyurethane (e.g., thermoplastic polyurethane (TPU)), foam (e.g., a wear-resistant foam), or a combination thereof. In some embodiments, the sole 30 and the outsole may be formed of the same or different material. In one embodiment, they may be molded together as a unitary structure.

Figure 2:
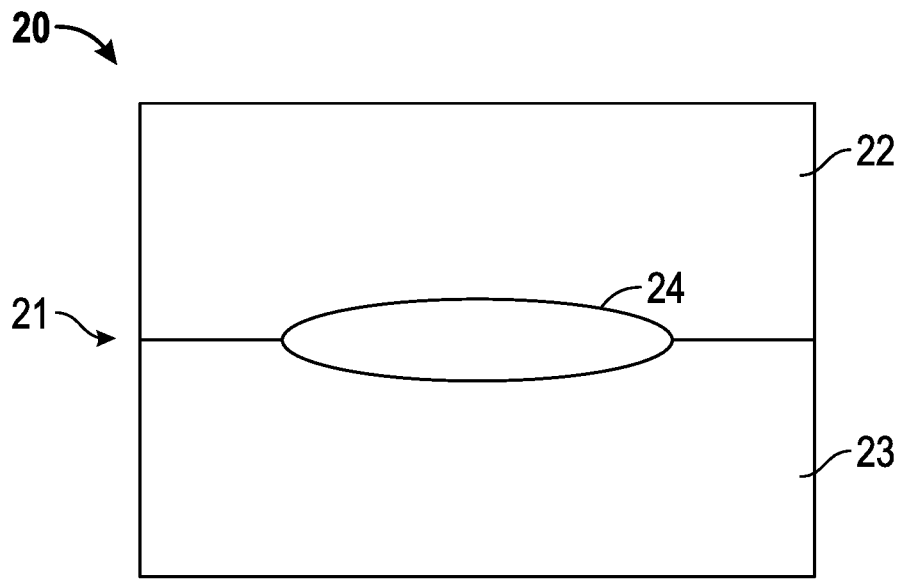
FIG. 2 is a partial cross-sectional view of a molded upper according to an embodiment of the present invention.
Figure 6:
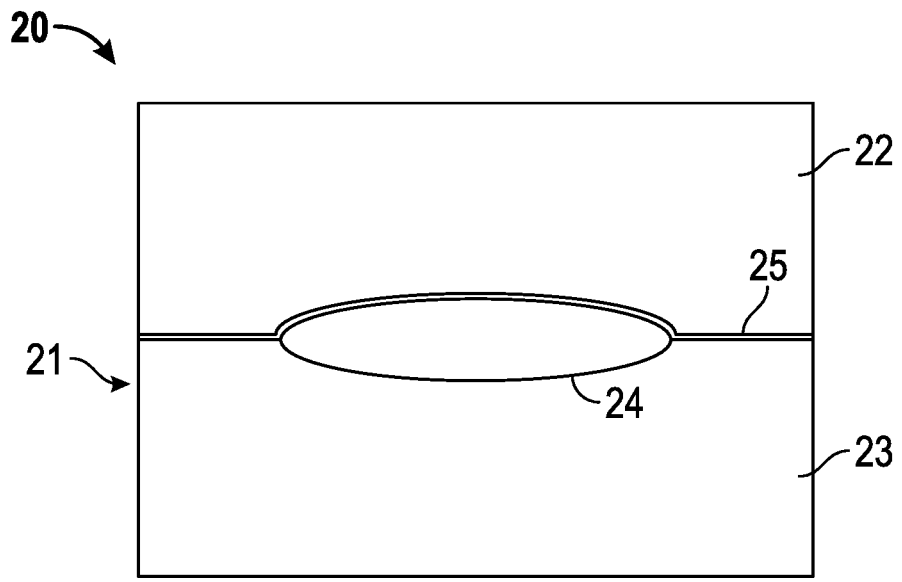
FIG. 6 is a partial cross-sectional view of a molded upper having a continuous foam layer according to another embodiment of the present invention.

As shown, for example, in FIGS. 2 and 6, in one embodiment laminate 21 includes the outer layer 22 and the inner layer 23 enveloping a first foam layer, the cushioning member 24. In one embodiment, the laminate 21 may further include a foam sheet 25. In one embodiment, the foam sheet 25 is disposed intermediate to the cushioning member 24 and the outer layer 22. In another embodiment, the foam sheet 25 may be disposed intermediate to the cushioning member 24 and the inner layer 23. The foam sheet 25 may be a continuous layer that extends over all or a portion of the surface of the laminate 21. In one embodiment, the cushioning member 24 may have a thickness in the range of about 0.5 mm to about 20 mm. The foam sheet 25 may have a thickness in the range of about 0.5 mm to about 1.5 mm. The foam sheet 25 may provide a smoothing effect to the upper 20 so as to smooth the transition between an area of the upper 20 having the cushioning member 24 to an area of the upper having no cushioning member. In some embodiments, this may provide a desired shape, smoothness, softness, and cushioning property to the upper 20. In one embodiment, the foam sheet may provide support to the wearer during use. In one embodiment, the foam sheet 25 may comprise a permeable membrane such that vapor may be released from the interior of the upper 20 while reducing or preventing moisture from entering the interior of the upper 20. In one embodiment, the foam sheet 25 may comprise a anti-microbial material.

In one embodiment, the foam sheet 25 may be attached to an adjacent layer of the laminate 21 using a urethane spray or other suitable adhesive. The adhesive preferably does not create stiffness differences between areas of the upper 20. The depiction of the laminate structure in FIG. 6 is intended to be illustrative only and not limiting. The size and shape of the outer layer 22, the inner layer 23, the cushioning member 24, and the foam sheet 25 may vary to provide the desired characteristics of the upper 20. In some embodiments, one or more of these elements may not be provided in the laminate 21. Suitable material for the foam sheet 25 may include, but is not limited to, foam and thermoplastic polyurethane. The foam may be, for example, ethyl vinyl acetate (EVA) based or polyurethane (PU) based and the foam may be an open-cell foam or a closed-cell foam.

Figure 7:
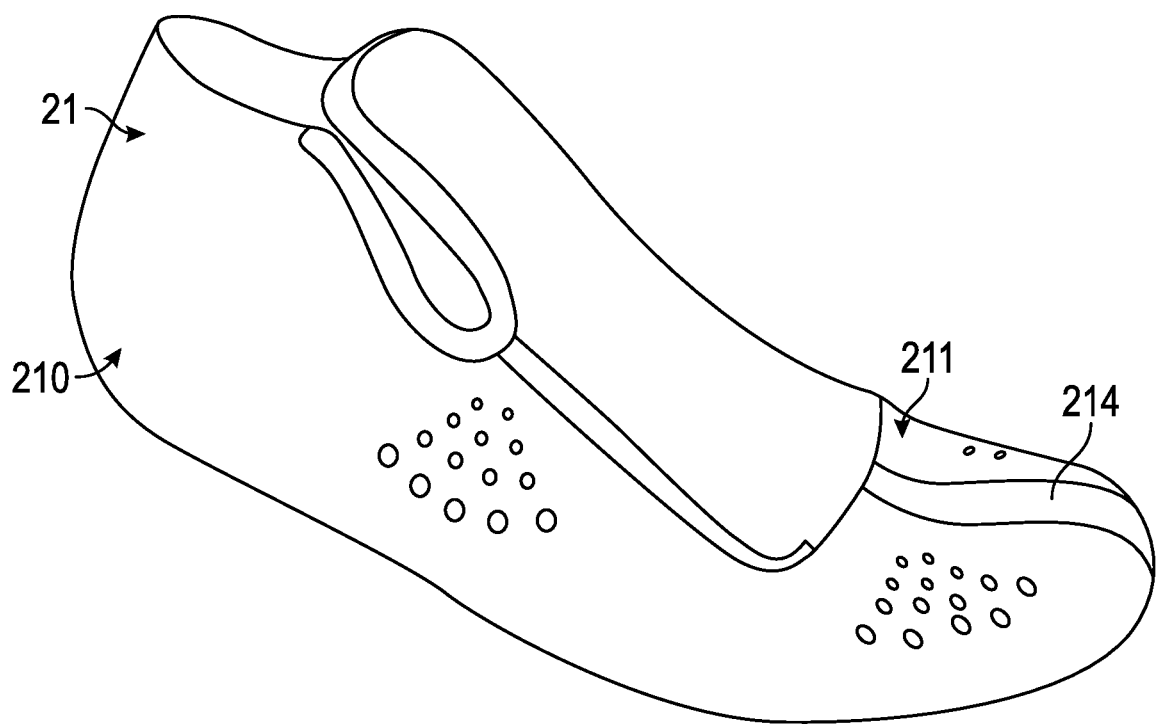
FIG. 7 is a perspective view of a molded upper for an article of footwear according to an embodiment of the present invention.

In one embodiment, the laminate 21 is molded to a shape having a contour to substantially fit at least a portion of a foot. In one embodiment, the laminate 21 may include a first portion 210 to be molded to a shape having a contour to substantially fit a first portion of a foot and a second portion 211 to be molded to a shape having a contour to substantially fit a second portion of a foot. For example, with reference to FIGS. 7 and 8, the laminate 21 may include a lateral portion 210 to be molded to a shape having a contour to substantially fit a lateral portion of a foot and a medial portion 211 to be molded to a shape having a contour to substantially fit a medial portion of a foot. As shown in FIG. 7, in one embodiment the lateral portion 210 may substantially cover the lateral side of the foot from the heel region 102 to the toe region 106, and the medial portion 211 may substantially cover the medial side of the foot from the heel region 102 to the toe region 106. In other embodiments, the lateral portion 210 and/or the medial portion 211 may cover only a portion of the respective side of the foot. For example, the lateral portion 210 may cover only the heel region 102 of the lateral side of the foot, or the medial portion 211 may cover only from the heel region 102 to the midfoot region 104 of the medial side of the foot.

Figure 9:
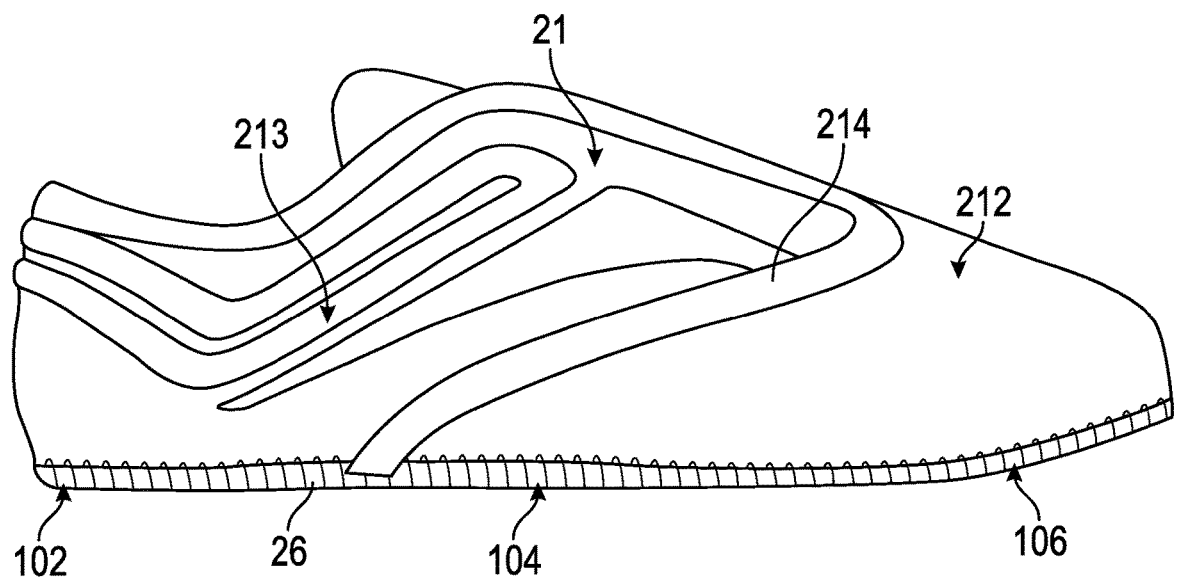
FIG. 9 is a lateral side view of a molded upper for an article of footwear having a forefoot portion and a heel portion according to an embodiment of the present invention.

In another embodiment, with reference to FIG. 9, for example, the laminate 21 may include a forward portion 212 and a rearward portion 213. For example, the forward portion 212 of the laminate 21 may be molded to a shape having a contour to substantially fit a forward portion of the foot extending from the midfoot region 104 to the toe region 106 on both the medial and lateral sides of the foot, and the rearward portion 213 may be molded to a shape having a contour to substantially fit a rearward portion of the foot extending from the midfoot region 104 to the heel region 102 on both the medial and lateral sides of the foot. The size, shape, and location of the first portion 210 and the second portion 211 may vary as needed.

Figure 11:
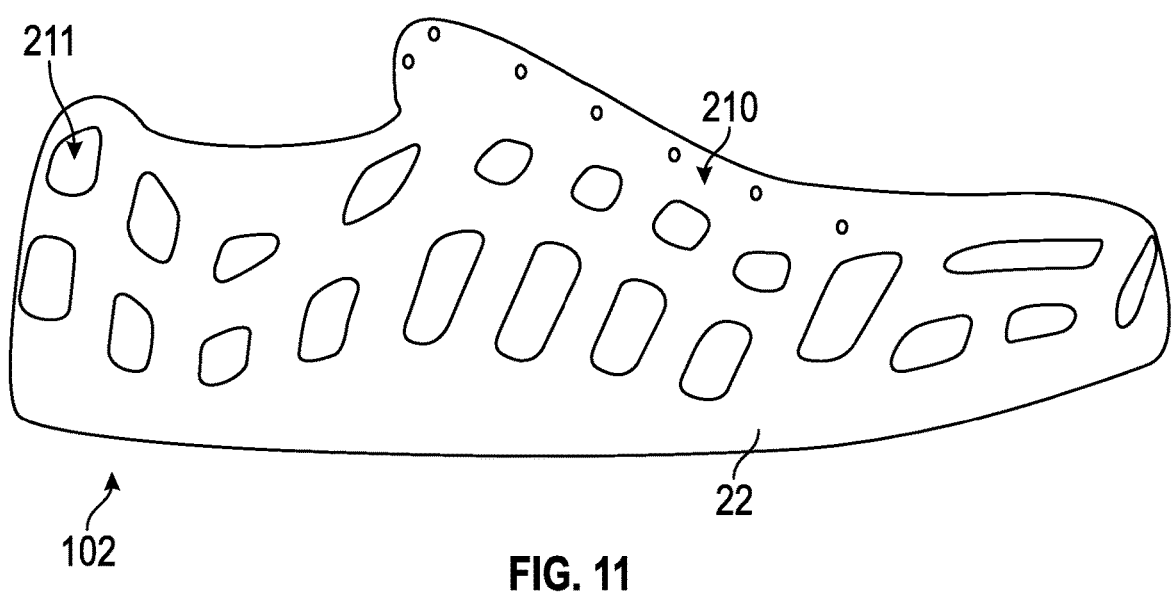
FIG. 11 is a lateral side view of a molded upper for an article of footwear having a lateral side portion and a medial side portion according to an embodiment of the present invention.
Figure 12:
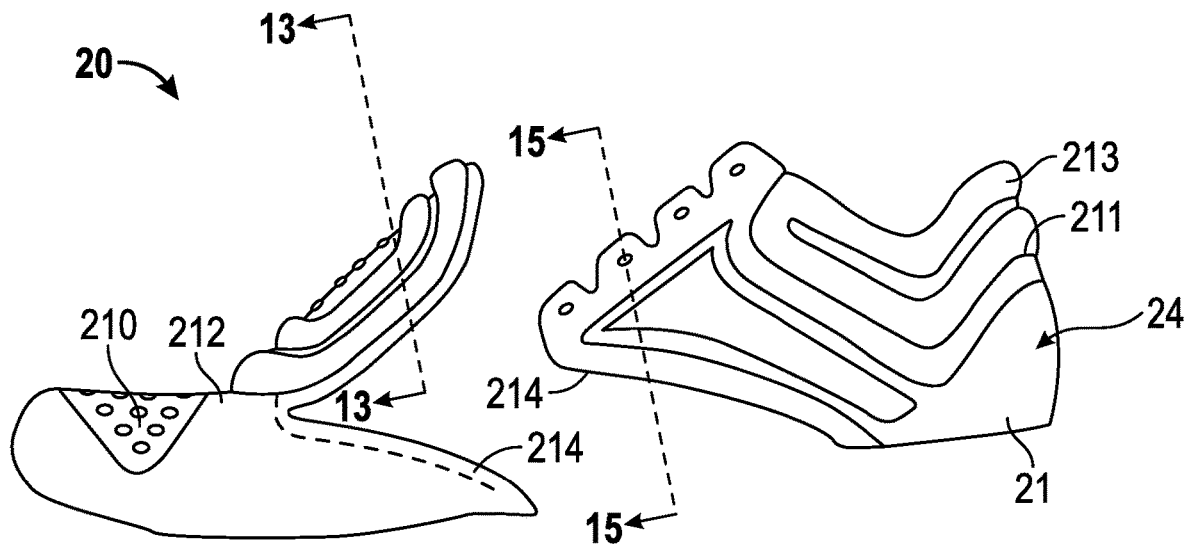
FIG. 12 is a side view of a molded upper for an article of footwear having a forefoot portion and a heel portion according to an embodiment of the present invention.
Figure 13:
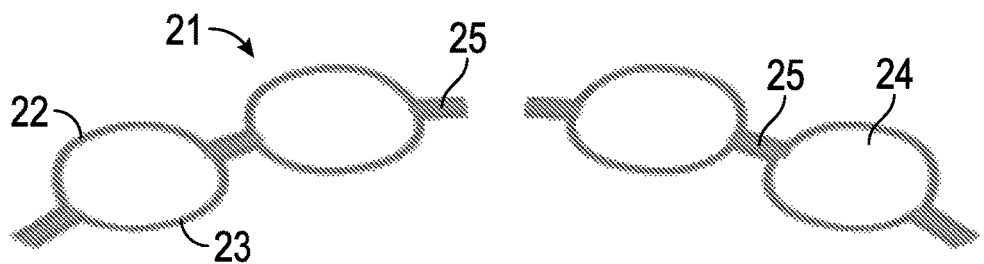
FIG. 13 is a cross sectional view of a portion of the molded upper shown in FIG. 12 along the line 13-13 according to an embodiment of the present invention.
Figure 14C:
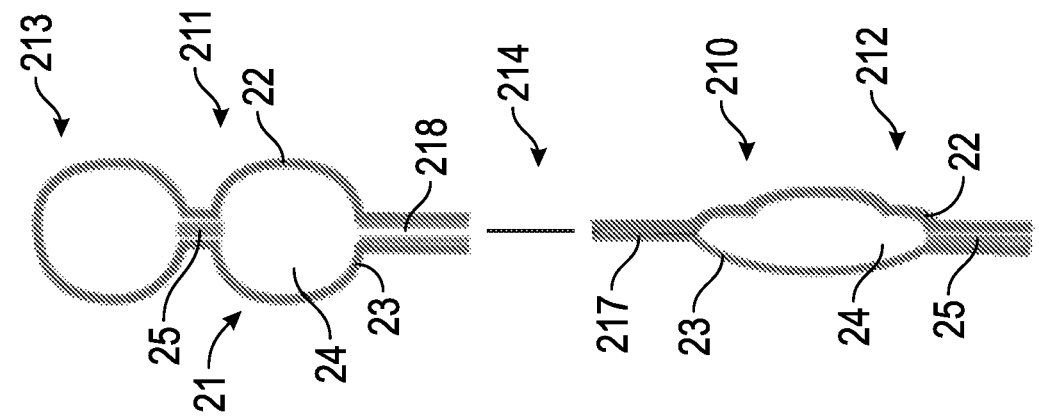
FIG. 14C is a cross sectional view of a portion of the molded upper shown in FIG. 12 according to another embodiment of the present invention.
Figure 14B:
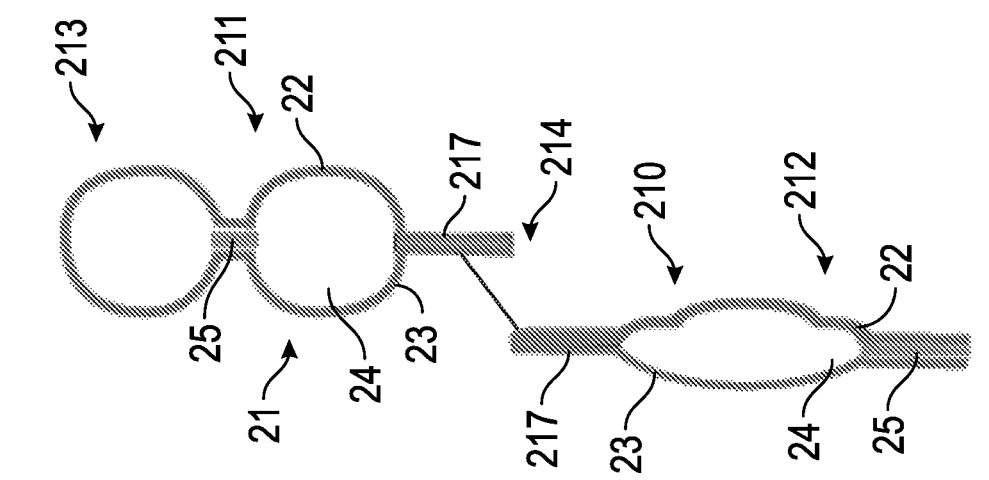
FIG. 14B is a cross sectional view of a portion of the molded upper shown in FIG. 12 according to another embodiment of the present invention.
Figure 14A:
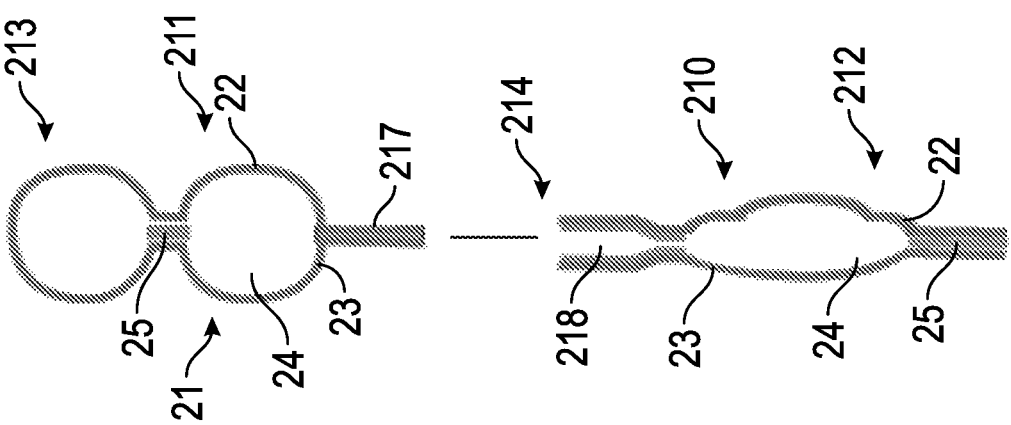
FIG. 14A is a cross sectional view of a portion of the molded upper shown in FIG. 12 according to an embodiment of the present invention.

In one embodiment, the first portion 210 and the second portion 211 may be molded from the same laminate 21 such that both portions share at least one continuous layer of the laminate 21 in common (e.g., the outer layer 22, the inner layer 23, the cushioning member 24, and/or the foam sheet 25, where included). For example, with reference to FIG. 11, the laminate 21 may include a lateral portion 210 to be molded to a shape having a contour to substantially fit a lateral portion of a foot and a medial portion 211 to be molded to a shape having a contour to substantially fit a medial portion of a foot, wherein both portions share a continuous outer layer 22 (shown), inner layer 23, and cushioning member 24 in common. In this manner, the lateral portion 210 and the medial portion share a common border in the heel region 102 of the upper 20, as shown. In some embodiments, a first portion 210 and a second portion 211 molded from the same laminate 21 may share a common border along another portion of the upper 20, such as, for example, along the length of the bottom of the upper. In other embodiments, a single portion 210 may be molded from a laminate 21. In one embodiment, a first portion 210 may be molded from a first laminate 21, and a second portion 211 may be molded from a second laminate 21 such that the first portion 210 and the second portion 211 do not share at least one continuous layer of laminate and do not share a common border.

In embodiments in which one or more laminates 21 are molded to form a first portion 210 and a second portion 211, the first portion 210 and the second portion 211 may be attached, after the one or more laminates 21 are molded, to form a single piece upper 20 for an article of footwear. The first portion 210 and the second portion 211 may be attached by one or more of adhesive, stitching, adhesive seam tape, RF welding, ultrasonic bonding, and other suitable attachment means. In one embodiment, adhesive seam tape used may comprise thermoplastic seam tape comprising a material selected form the group consisting of polyurethane, polyamide, polyester, nylon, polyolefin, vinyl, polypropylene, thermoplastic urethane, tricot, acrylic, and PVC. An example of suitable seam tape for use in embodiments of the present invention is produced by Bemis Associates, Inc. of Shirley Massachusetts.

Figure 8:
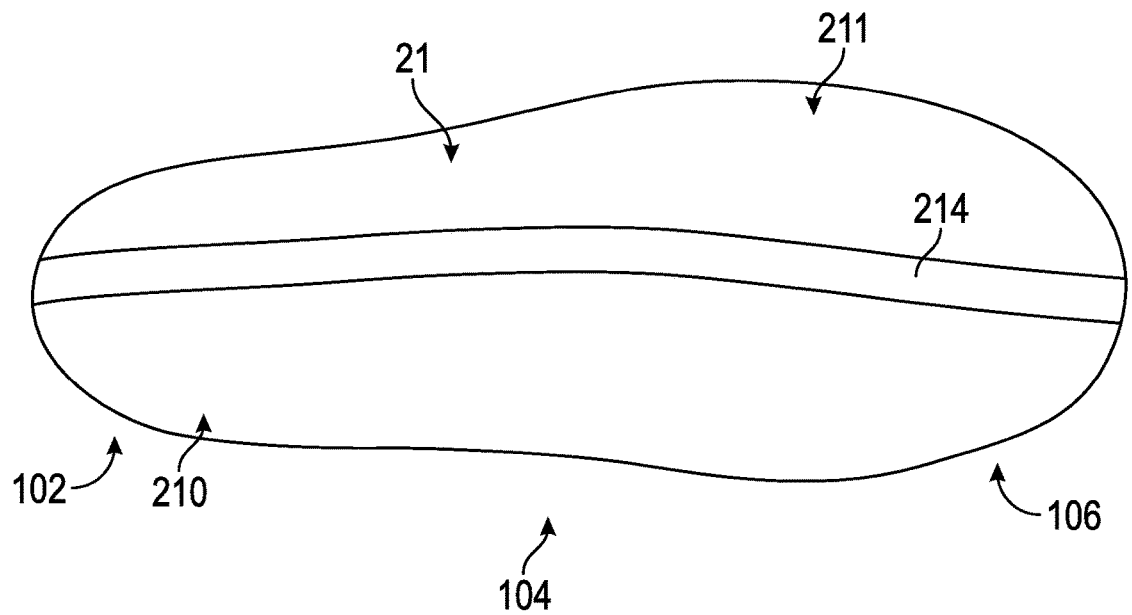
FIG. 8 is a bottom view of the molded upper of FIG. 7 according to an embodiment of the present invention.

As shown in FIGS. 7 and 8, for example, the first portion 210 and the second portion 211 may be attached along a longitudinal seam 214 along the length of the bottom of the upper 20 from the heel region 102 to the toe region 106. In one embodiment, as shown, for example, in FIG. 9, the seam 214 may extend from a bottom edge 26 of the upper 20 along a portion of midfoot region 104 of the upper 20. In one embodiment, the seam 214 may extend along only a portion of the upper 20 so as to create an opening (not shown) to allow venting of air into or out of the interior of the upper 20.

Figure 10:
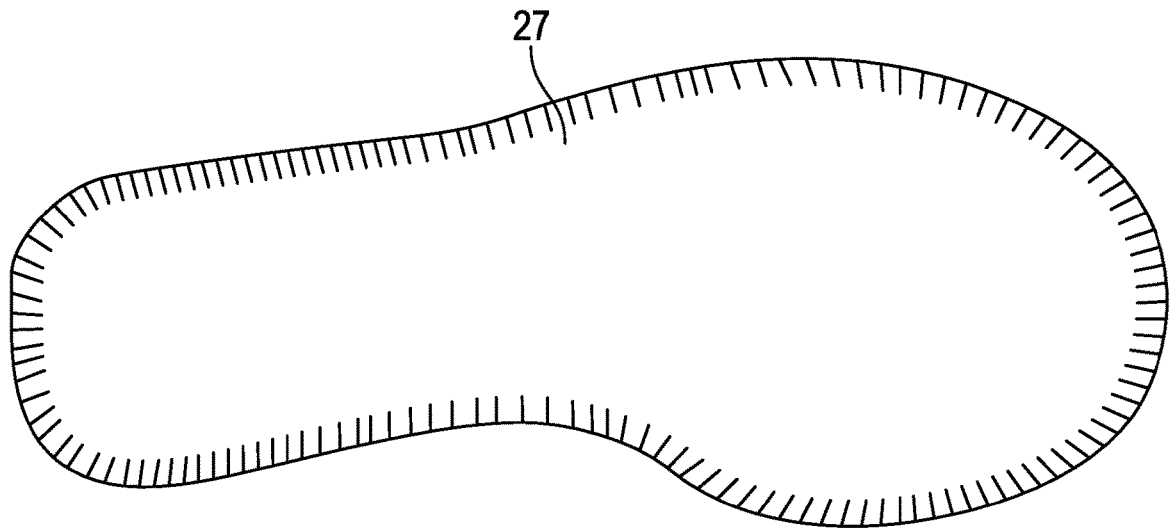
FIG. 10 is a bottom view of the molded upper of FIG. 9 according to an embodiment of the present invention.

In one embodiment, the first portion 210 and the second portion 211 may not comprise an entire upper 20 when attached. As shown for example, in FIG. 10, the forward portion 212 and the rearward portion 213, when attached, may not include an upper bottom 27. A bottom 27 may be attached, by strobel stitching or other suitable means, to the first portion 210 and the second portion 211 so as to provide the upper 20.

With reference to FIGS. 12-15, an upper 20 having a forward portion 212 and a rearward portion 213 adapted to be attached along a seam 214 will now be described. In one embodiment, as shown, for example, in FIG. 14A, the forward portion 212 may be formed with a perimeter tab 217 extending from the laminate 21 and the rearward portion 213 may be formed with an opening 218 between the outer layer 22 and the inner layer 23 for receiving the perimeter tab 217. The perimeter tab 217 may be attached to the rearward portion 213 with adhesive (as shown), stitching, adhesive seam tape, RF welding, ultrasonic bonding, and/or other suitable attachment techniques. In one embodiment, as shown, for example, in FIG. 14C, the perimeter tab 217 may be formed by the rearward portion 212 and the opening 218 between the outer layer 22 and the inner layer 23 may be formed by the forward portion 212. In one embodiment, as shown, for example, in FIG. 14B, both the forward portion 212 and the rearward portion 213 may be formed with a perimeter tab 217 extending from the laminate 21. The forward and rearward perimeter tabs 217 may be overlapped and then attached. In one embodiment, the forward portion 212 and the rearward portion 213 may be attached by a butt seam.

Figure 15:
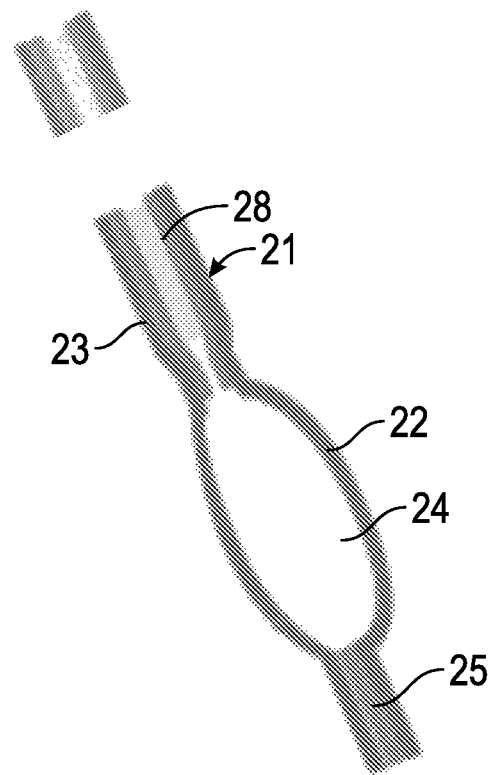
FIG. 15 is a cross sectional view of a portion of the molded upper shown in FIG. 12 along the line 15-15 according to an embodiment of the present invention.
Figure 22:
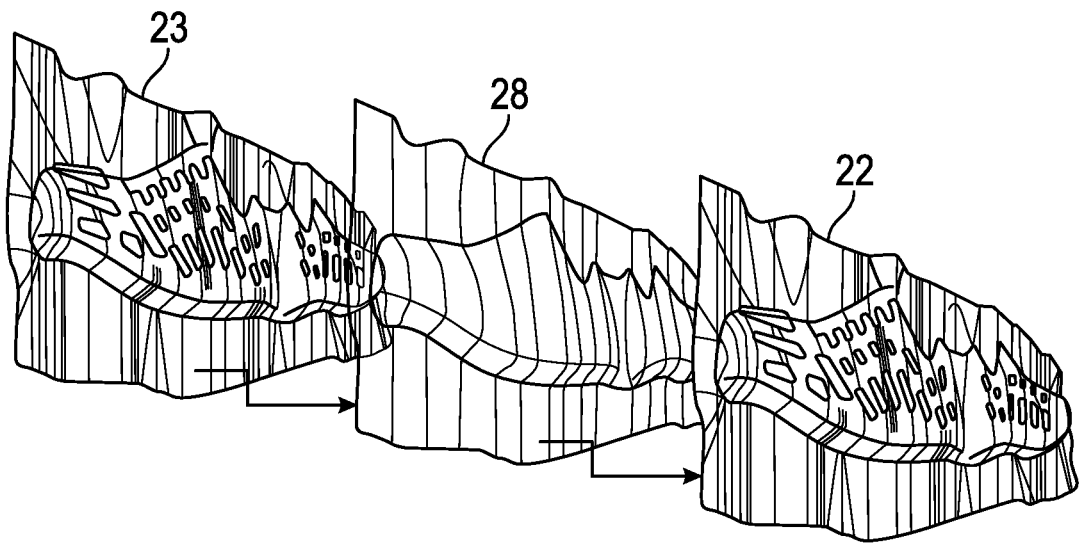
FIG. 22 is a partial schematic diagram of a molded upper according to an embodiment of the present invention.

In one embodiment, as shown, for example, in FIGS. 15 and 22, the laminate 21 may further include one or more reinforcing layers 28. The reinforcing layer 28 may provide desired stiffness to the upper 20 at a desired location. For example, the reinforcing layer 28 may be used in rearward portion 213 approximate the lacing eyelets to provide desired stiffness to this area to facilitate lacing of the upper 20. The reinforcing layer 28 may include a series of holes (not shown) to coincide with the eyelets. In one embodiment, the reinforcing layer 28 may comprise a stretchable material, including, but not limited to, elasticated banding material (e.g, Gore®), elasticated webbing, knitted material (e.g., circular knitted material), and other suitable stretchable material. In another embodiment, the reinforcing layer 28 may comprise a non-stretchable material, including, but not limited to, non-woven or woven textile material. In one embodiment, the reinforcing layer 28 may comprise a mesh layer. In some embodiments, both a stretchable reinforcing layer 28 and a non-stretchable reinforcing layer 28 may be used. For example, from outermost layer to innermost layer the laminate 21 may include an outer layer 22 (comprising, for example, Lycra®), a non-stretchable reinforcing layer 28, a foam sheet 25, a foam cushioning member 24, a stretchable reinforcing layer 28, and an inner layer 23 (comprising, for example, Lycra®).

Figure 16:
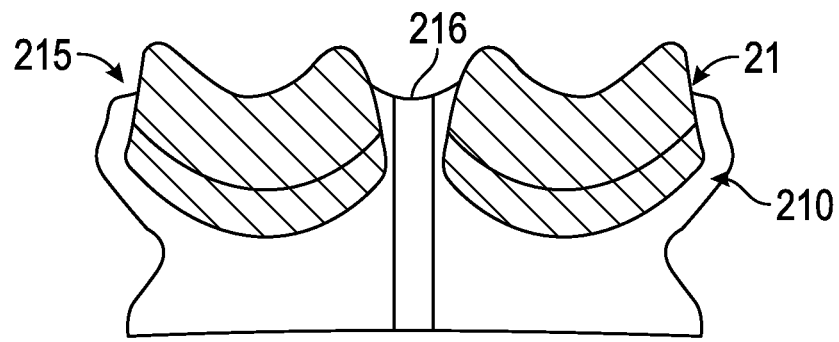
FIG. 16 is a laminate package of a portion of a molded upper for an article of footwear according to an embodiment of the present invention.
Figure 17:
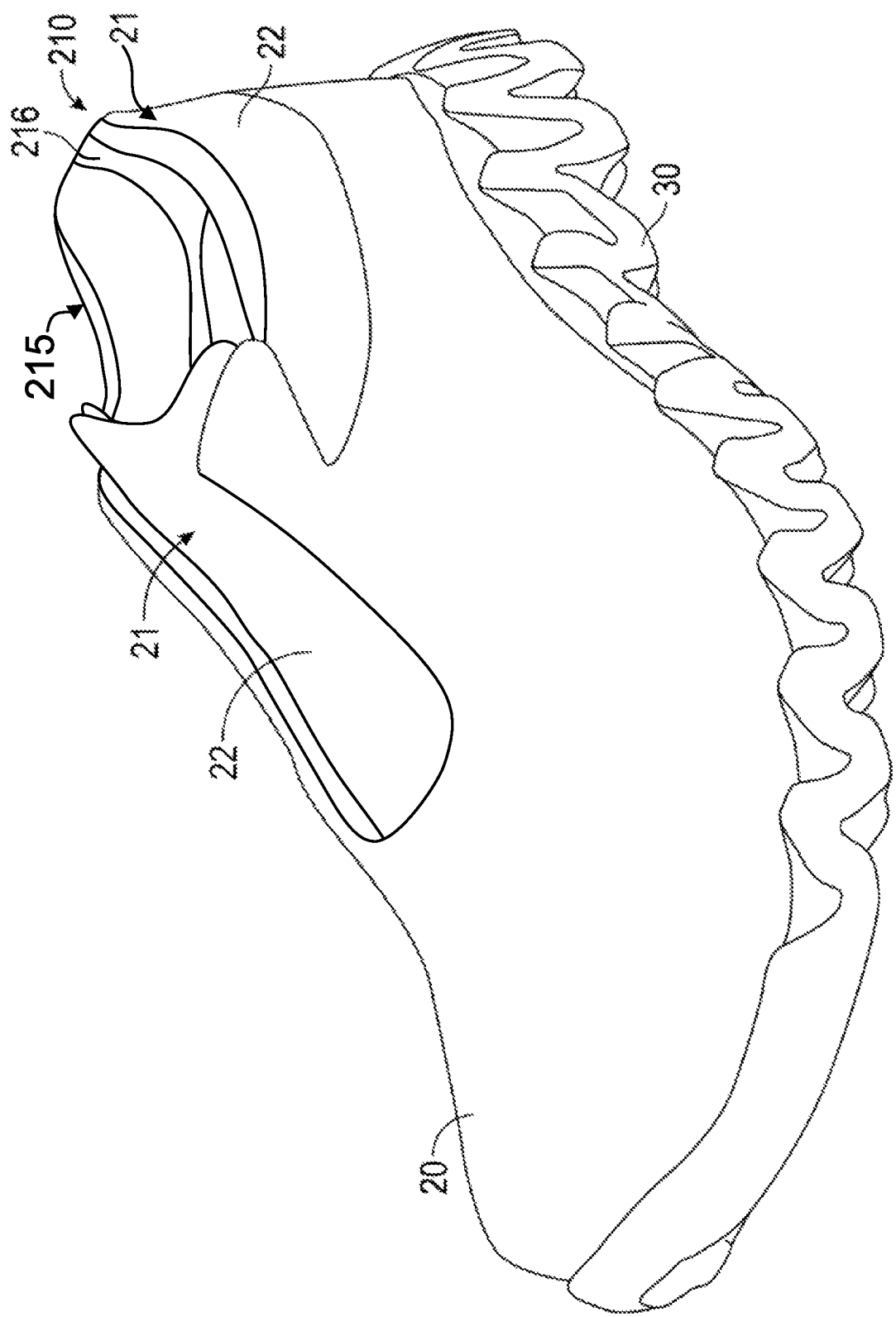
FIG. 17 is a perspective view of an article of footwear having a molded upper portion of FIG. 14 according to an embodiment of the present invention.

As discussed, the laminate 21 is molded to a shape having a contour to substantially fit at least a portion of a foot. In one embodiment, as shown, for example, in FIGS. 16 and 17, the laminate 21 may include a first portion 210 to be molded to a shape having a contour to substantially fit a heel collar portion 215 of the upper 20. The laminate 21 may be molded to include a hinge 216. The hinge 216 may comprise a portion of the laminate 21 without a cushioning member 24 that is adjacent to areas of the laminate having a cushioning member 24. The hinge 216 may substantially align with a vertical segment at the heel of the foot. In this manner, the heel collar portion 215 may have a clamshell-like structure that may facilitate the portion substantially fitting the contours of the heel of the foot. In one embodiment, as shown, for example, in FIG. 17, the heel collar portion 215 may include a thick cushioning member 24 (relative to cushioning members 24 provided in other areas of the upper 20) so as to provide an enlarged heel collar portion 215.

Figure 18:
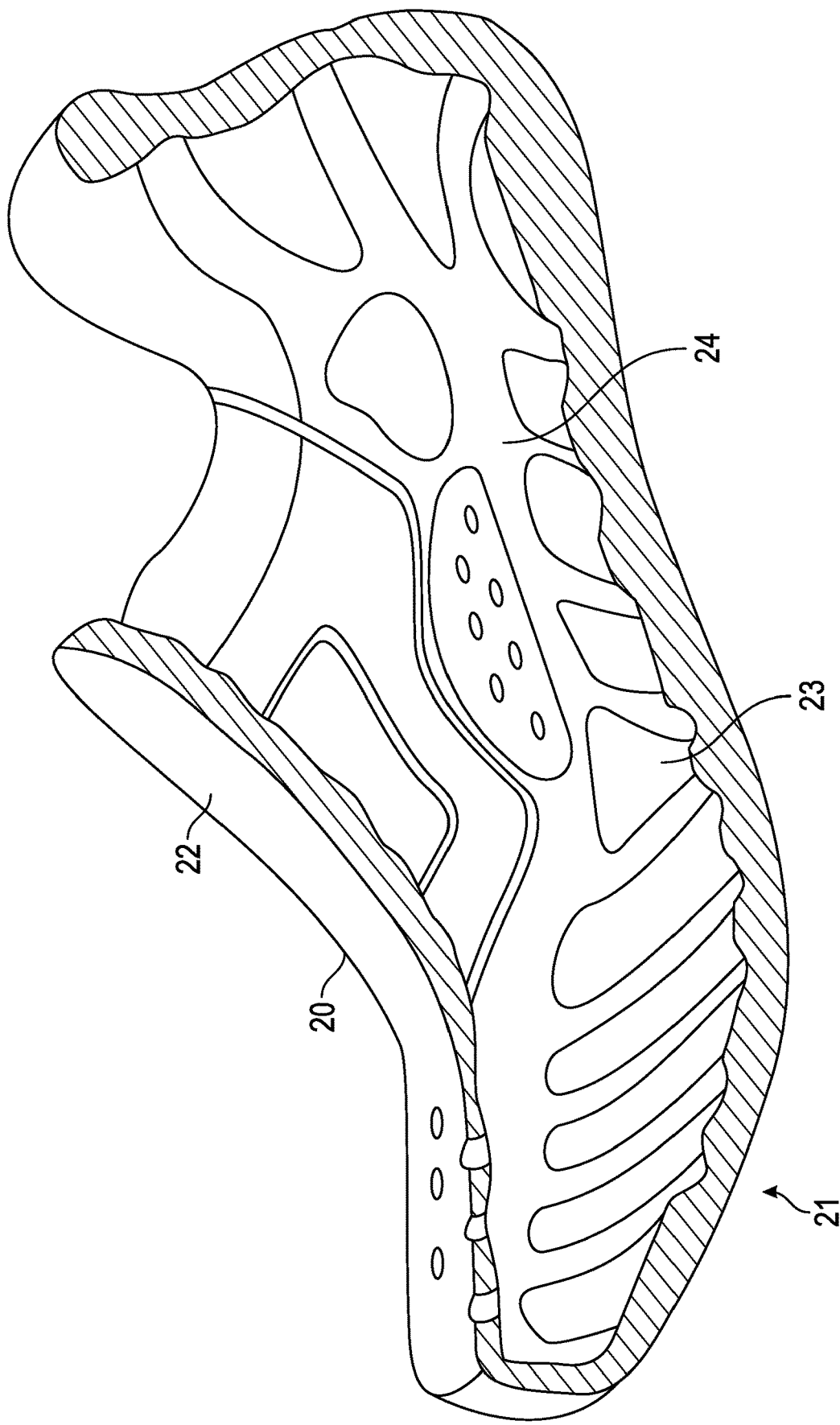
FIG. 18 is a cross-sectional side view of an article of footwear having a molded upper according to an embodiment of the present invention.

FIG. 18 is a partial cross-sectional view of a molded upper 20 according to an embodiment of the present invention. As discussed above, the size and shape of the cushioning layer 24 may vary depending on the desired characteristics of the upper 20. In one embodiment, the cushioning layer 24 may be contoured for anatomical purposes. In one embodiment, the cushioning layer 24 may be contoured to create a massaging effect on the wearer. In one embodiment, all or a portion of the cushioning layer may be contoured for extra comfort. In one embodiment, the upper 20 may be molded to include an integral a lining or footbed, as shown. In this embodiment, the shoe 10 may be provided without a sock liner. In this manner, the molded upper 20 may comprise a "bootie" with comfort and feel of the laminate 21 around the entire foot.

In one embodiment, the laminate 21 may initially comprise the inner layer 23 and the cushioning member 24 (with or without the foam sheet 25) and the outer layer 22 may be added after the preliminary upper structure has been molded. The outer layer 22 may be added using similar a molding process. In some embodiments, this may provide an efficient manufacturing process whereby the outer layer 22 may be customizable. For example, different color or pattern outer layers 22 may be used with the same underlying inner layer 23 and cushioning member laminate. In this manner, in one embodiment a modular upper 20 may be provided with a standard interior of the upper 20 (e.g., inner layer 23) and flexibility in styling the exterior of the upper 20 (e.g., outer layer 22).

Figure 19:
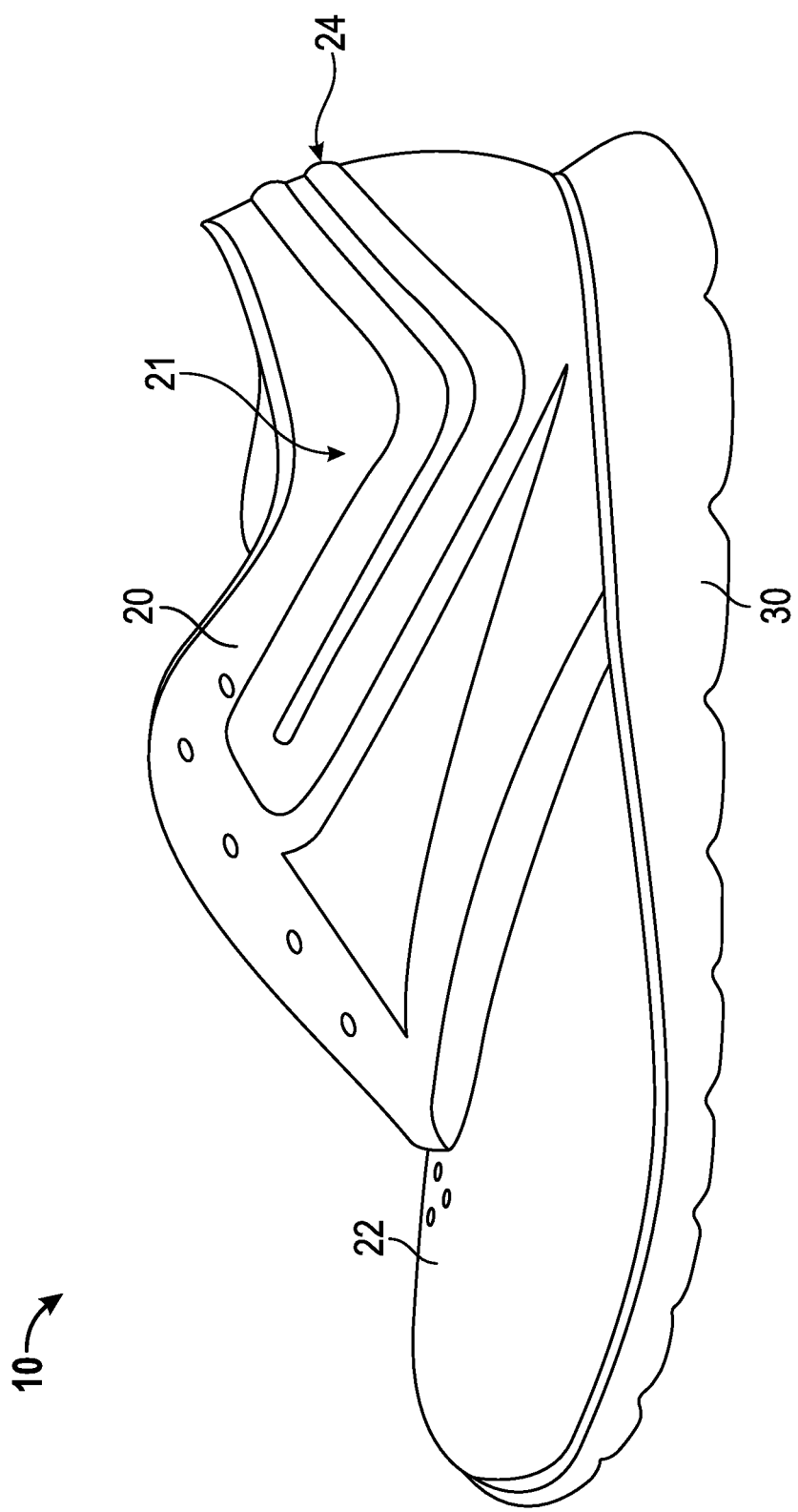
FIG. 19 is a lateral side view of an article of footwear having a molded upper according to an embodiment of the present invention.
Figure 20:
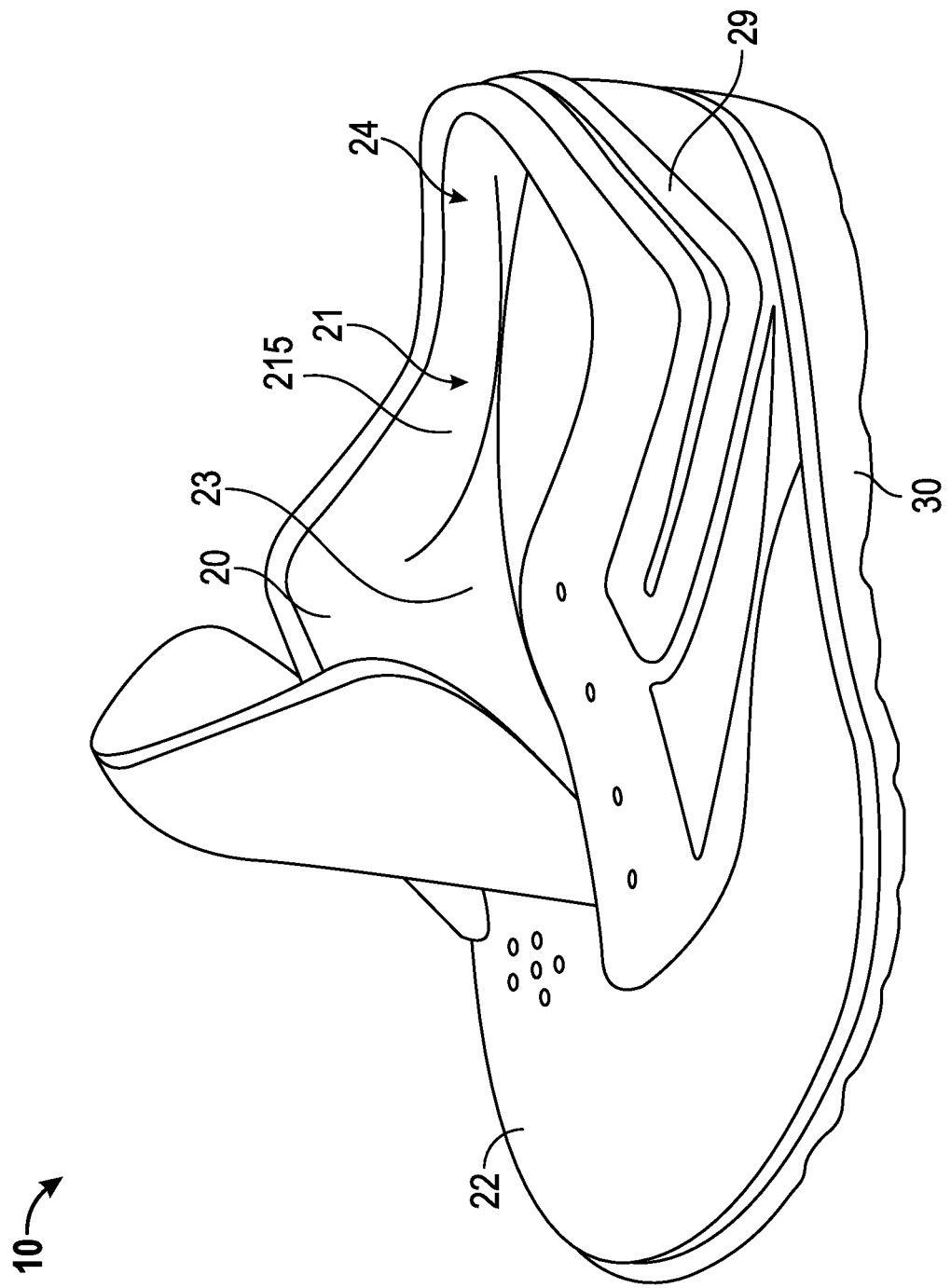
FIG. 20 is a partial interior view of the article of footwear of FIG. 19 having a molded upper according to an embodiment of the present invention.

With reference to FIGS. 19 and 20, a molded upper 20 according to an embodiment of the present invention includes a laminate 21 having an inner layer 23, an outer layer 22, and a cushioning member 24 disposed between the inner 23 and outer 22 layers. As discussed above, the size and shape of the cushioning layer 24 may vary depending on the desired characteristics of the upper 20. In one embodiment, as shown for example in FIGS. 19 and 20, the cushioning layer 24 may include a plurality of ribs 29 that extend from a midfoot portion of the upper on the lateral side around the heel portion of the upper to the medial side of the upper. The cushioning layer 24 may further include a heel collar portion 215 that extends about the interior collar of the heel portion of the upper.

Figure 21:
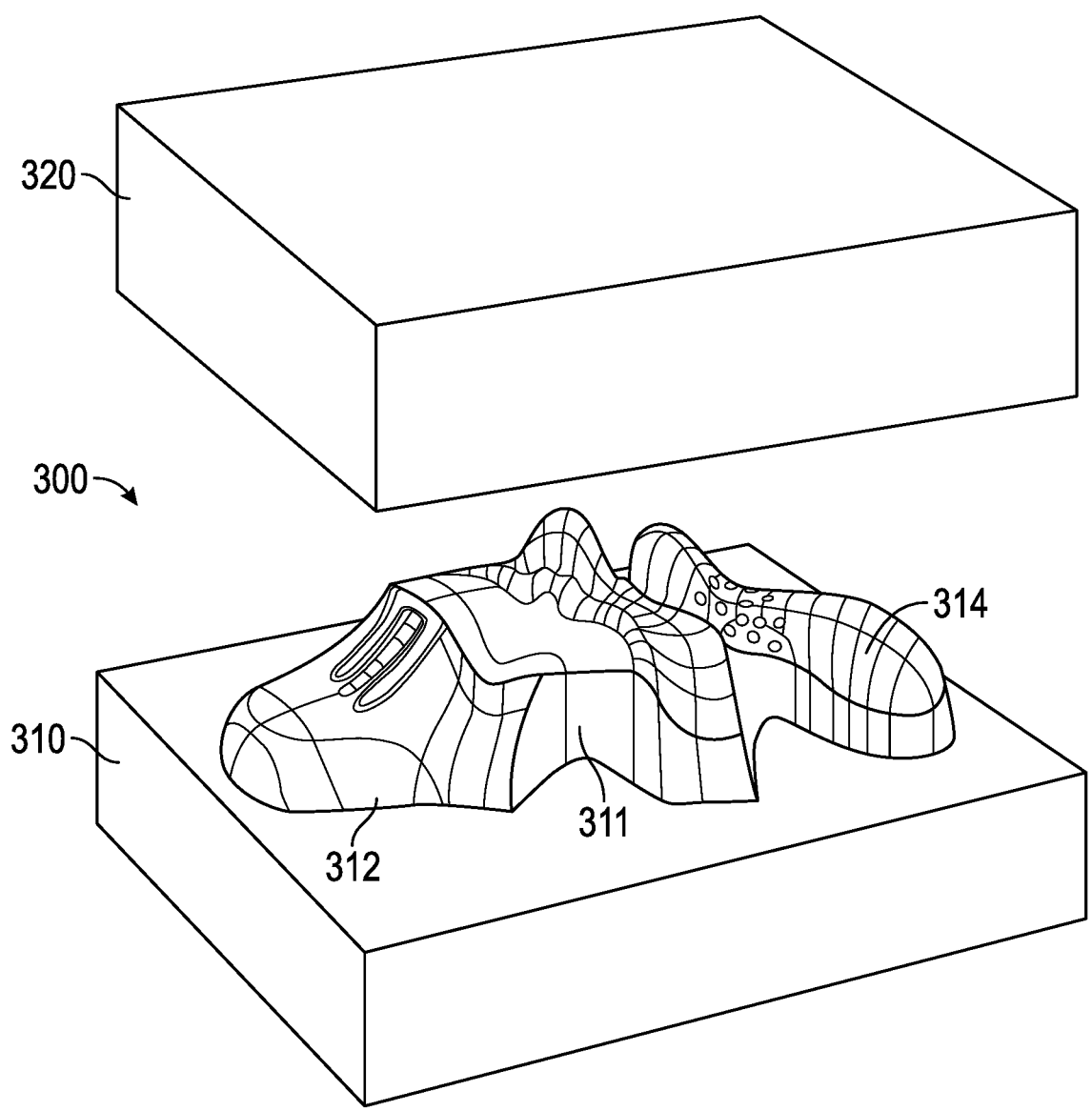
FIG. 21 is a schematic view of a mold for use in a method for manufacturing an upper for an article of footwear according to an embodiment of the present invention.

With reference to FIG. 21, in one embodiment a mold 300 for molding an upper 20 according to embodiments of the present invention includes a lower plate 310 and an upper plate 320. The lower plate may include a three-dimensional profile of an upper 20 having a first portion 312 and a second portion 314, and the upper plate includes a corresponding relief or cavity (not shown) for receiving the profile 311 during the molding process.

Figure 24:
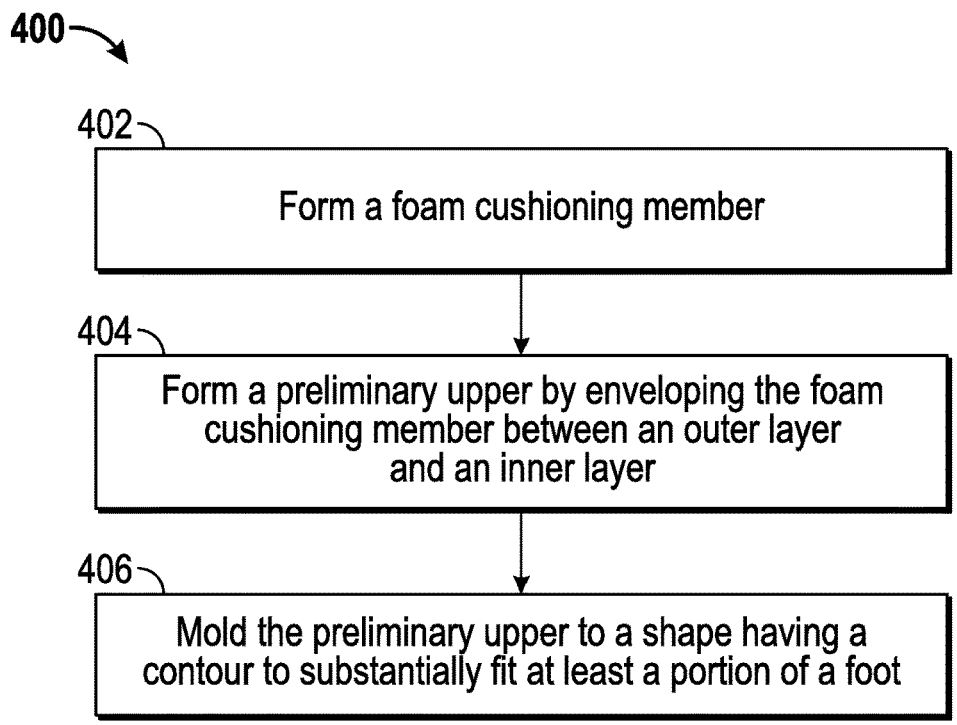
FIG. 24 is an exemplary flow diagram of a method for manufacturing an upper for an article of footwear according to an embodiment of the present invention.

With reference to FIG. 24, a method 400 for manufacturing an upper for an article of footwear according to embodiments of the present invention will now be described. In one embodiment, the method includes steps 402, 404, and 406, and may include additional or fewer steps. In step 402, a foam cushioning member 24 is formed. In step 404, a preliminary upper 21 is formed by enveloping the foam cushioning member 24 between an outer layer 22 and an inner layer 22. In step 406, the preliminary upper 21 is molded to a shape having a contour to substantially fit at least a portion of the foot.

Figure 25:
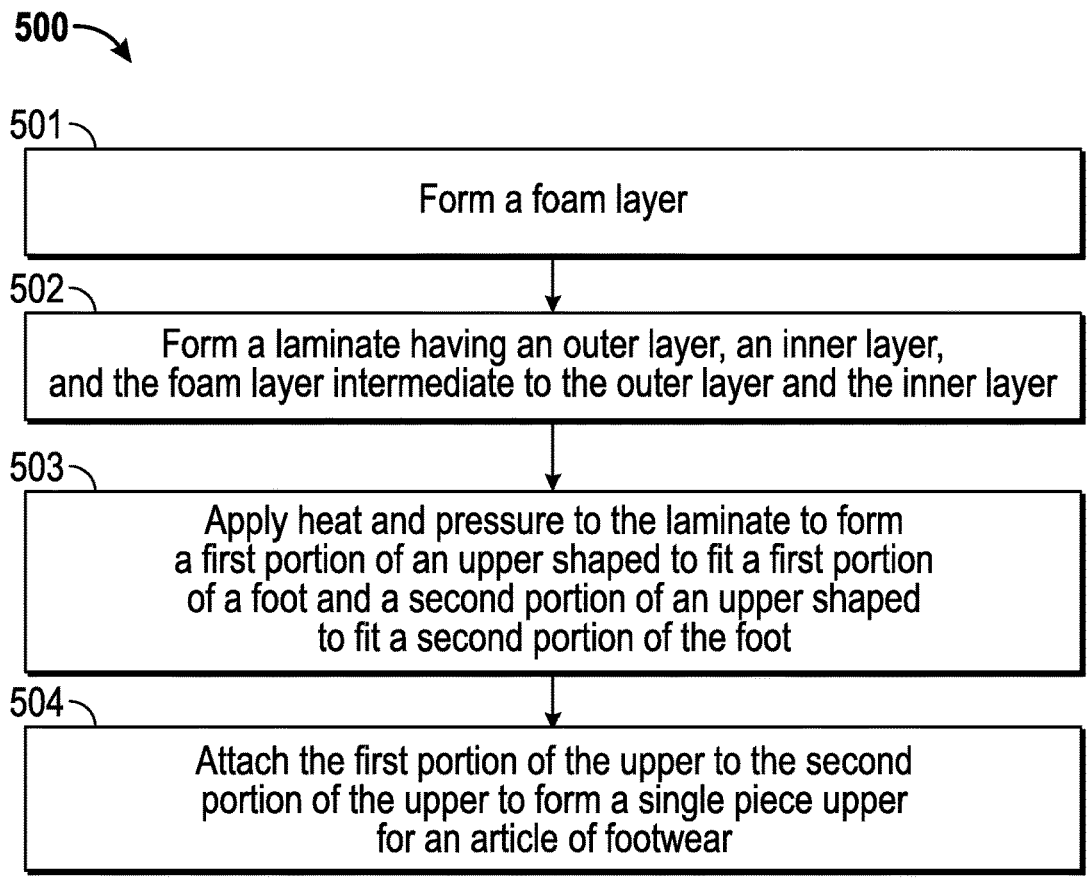
FIG. 25 is an exemplary flow diagram of a method for manufacturing an upper for an article of footwear according to an embodiment of the present invention.

With reference to FIG. 25, a method 500 for manufacturing an upper for an article of footwear according to embodiments of the present invention will now be described. The method includes steps 501, 502, 503, and 504, and may include additional or fewer steps. In step 501, a foam layer 24 is formed. In step 502, a laminate 21 is formed having the foam layer 24 in between an outer layer 22 and an inner layer 23. In step 503, heat and pressure is applied to the laminate 21 to form a first portion of an upper shaped to fit a first portion of a foot and a second portion of an upper shaped to fit a second portion of the foot. In step 504, the first portion of the upper is attached to the second portion of the upper to form a single piece upper for an article of footwear.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for manufacturing an upper for an article of footwear, comprising:
  forming a contoured foam layer to include a first shape having a variable thickness;
  forming a preliminary upper by laminating an outer layer comprising an elastic material, an inner layer comprising an elastic material, and the contoured foam layer intermediate to the outer layer and the inner layer, wherein the contoured foam layer is contoured to fit within an area formed between opposing points of intersection between the outer and inner layers such that the first shape of the contoured foam layer is the same shape as the area formed between the opposing points of intersection of the outer and inner layers, wherein the contoured foam layer laminated intermediate to the outer layer and the inner layer has a substantially uniform density throughout; and
  molding the preliminary upper such that a contour of the preliminary upper is shaped to include a second shape that substantially fits at least a portion of a foot to provide at least a portion of the upper for the article of footwear, wherein the contour of the preliminary upper is defined by an outer surface of the outer layer and an inner surface of the inner layer.

2. The method of claim 1, wherein the second shape of the contour of the preliminary upper fits a heel portion of the foot.

3. The method of claim 1, wherein the second shape of the contour of the preliminary upper fits a forefoot portion of the foot and a heel portion of the foot.

4. The method of claim 1, wherein the preliminary upper is molded to form a single piece upper having a medial portion, a lateral portion, and a footbed portion.

5. The method of claim 1, wherein the elastic material of the outer layer and inner layer comprises elastane.

6. The method of claim 1, wherein the step of molding the preliminary upper includes applying heat and pressure to the preliminary upper.

7. The method of claim 1, wherein the first shape of the contoured foam layer includes a second contour fitting a heel portion of a foot.

8. A method for manufacturing an article of footwear, comprising the steps of:
  forming a contoured foam cushioning member to include a first shape;
  forming a preliminary upper by enveloping the contoured foam cushioning member between an outer layer and an inner layer such that the contoured foam cushioning member tapers to a point of intersection between the outer layer and the inner layer, wherein the contoured foam cushioning member is not compressed to fit between the outer layer and the inner layer, wherein the contoured foam cushioning member laminated intermediate to the outer layer and the inner layer has a substantially uniform density throughout; and
  molding the preliminary upper such that a contour of the preliminary upper is shaped to include a second shape that substantially fits at least a portion of a foot, wherein the contour of the preliminary upper is defined by an outer surface of the outer layer and an inner surface of the inner layer.

9. The method of claim 8, wherein the molding step includes placing the preliminary upper on a mold and applying heat and pressure, wherein a first region of the mold corresponds to a portion of a medial side of a foot and a second region of the mold corresponds to a portion of a lateral side of the foot.

10. The method of claim 8, wherein the molding step includes placing the preliminary upper on a mold having a shape corresponding to a medial side of a foot and applying heat and pressure to the preliminary upper.

11. The method of claim 8, wherein the molding step includes placing the preliminary upper on a mold having a shape corresponding to a lateral side of a foot and applying heat and pressure to the preliminary upper.

12. The method of claim 8, wherein the contoured foam cushioning member is formed by molding.

13. The method of claim 8, wherein the contoured foam cushioning member tapers to a point of intersection between the outer layer and the inner layer such that there are no gaps between surfaces of the cushioning member and opposing surfaces of the inner layer and the outer layer.

14. The method of claim 8, wherein the contoured foam cushioning member is disposed between opposing points of intersection between the outer layer and the inner layer.

15. The method of claim 1, wherein the contoured foam layer is not compressed within the area formed between the opposing points of intersection between the outer and inner layers.

* * * * *